United States Patent
Satou et al.

[11] Patent Number: 5,838,465
[45] Date of Patent: Nov. 17, 1998

[54] COLOR COMPENSATING METHOD OF COLOR IMAGE AND COLOR IMAGE GENERATING APPARATUS

[75] Inventors: Tatsunari Satou; Taisaku Seino, both of Tsuchiura; Takeshi Shibuya, Ibaraki-ken, all of Japan

[73] Assignee: Hitachi, Ltd., Tokyo, Japan

[21] Appl. No.: 566,108

[22] Filed: Dec. 1, 1995

[30] Foreign Application Priority Data

Dec. 2, 1994 [JP] Japan .................................. 6-299274
Mar. 14, 1995 [JP] Japan .................................. 7-054022

[51] Int. Cl.⁶ .................................. G03F 3/08; G06K 9/00
[52] U.S. Cl. .......................... 358/520; 358/518; 358/504; 382/165; 382/167
[58] Field of Search ........................... 358/520, 521, 358/522, 518, 515, 516, 504, 501, 530, 534; 382/165, 167, 162, 163; G03F 3/08

[56] References Cited

U.S. PATENT DOCUMENTS

| | | | |
|---|---|---|---|
| 4,522,491 | 6/1985 | Ingalls et al. | 355/77 |
| 4,623,973 | 11/1986 | Hoffrichter | 358/520 |
| 4,668,979 | 5/1987 | Jiing | 358/520 |
| 4,754,323 | 6/1988 | Kaji et al. | 358/44 |
| 4,929,978 | 5/1990 | Kanamori et al. | 358/520 |
| 4,989,079 | 1/1991 | Ito | 358/520 |
| 4,989,080 | 1/1991 | Ito | 358/520 |
| 5,339,176 | 8/1994 | Smilansky et al. | 358/527 |
| 5,453,853 | 9/1995 | Sakai et al. | 358/518 |
| 5,592,310 | 1/1997 | Sugiura | 358/501 |
| 5,631,749 | 5/1997 | Ueda | 358/520 |

FOREIGN PATENT DOCUMENTS

| | | |
|---|---|---|
| 3-262273 | 11/1991 | Japan . |
| 3-277569 | 12/1991 | Japan . |
| 4-274467 | 9/1992 | Japan . |
| 4-335380 | 11/1992 | Japan . |
| 4-340563 | 11/1992 | Japan . |
| 5-150606 | 6/1993 | Japan . |
| 6-48852 | 2/1994 | Japan . |

*Primary Examiner*—Edward L. Coles
*Assistant Examiner*—Madeleine AV Nguyen
*Attorney, Agent, or Firm*—Antonelli, Terry, Stout & Kraus, LLP

[57] ABSTRACT

A color correcting method for a color image generating apparatus for overlapping 3 or 4 color materials according to color image data of 3 separated colors of yellow (Y), magenta (M) and cyan (C) or of 4 separated colors of Y, M, C and black (K) to obtain a multicolor image, wherein the apparatus includes a color detector, a test pattern is printed in a vertical/horizontal stripe form of 2-color combinations of 2 of the 3 or 4 colors and is measured by the color detector to find a hue value, a relative overlap deviation of the colors Y, M, C or Y, M, C, K is calculated from the found hue value, and an irradiation start position of a semiconductor laser in a main-scan direction and an irradiation start position of the semiconductor laser in a feed direction are controlled to correct the relative overlap deviation. Or a color correcting method and apparatus in which a color correction coefficient or one of a plurality of color correction tables previously prepared for overlap deviations corresponding to the color drift is selected and set in color correcting means for color correction, or color drifts in a continuous print mode and in a non-continuous print mode are corrected.

32 Claims, 23 Drawing Sheets

(a) MEASURED GAMMA CHARACTERISTIC (b) GAMMA CORRECTION CURVE (c) REFERENCE GAMMA CHARACTERISTIC AFTER CORRECTION

TEST CHART

NOT DEVIATED PATTERN

DEVIATED PATTERN

OVER LAP DEVIATION-SHADE RELATIONSHIP

RE-CORRECTION OF GRAY SCALE DATA

FIRST COLOR　　SECOND COLOR　　GROUND

FIXING TEMPERATURE/SATURATION, BRIGHTNESS RELATIONSHIP

FIG.40

COLOR DRIFT CORRECTION DATA GENERATION MODE

- ISSUE COMMAND TO PRINTER TO PERFORM CONTINUOUS 2-SHEET PRINT OF TEST CHART OF 2-COLOR COMBINATIONS
- PRINT FIRST SHEET OF TEST CHART
- DETECT COLORS OF 2-COLOR COMBINATIONS BY COLOR DETECTOR
- SET COLOR CORRECTION PARAMETERS OF FIRST SHEET
- PRINT SECOND SHEET OF TEST CHART
- DETECT COLORS OF 2-COLOR COMBINATIONS BY 2 COLOR DETECTORS
- SET COLOR CORRECTION PARAMETERS OF TEST CHART SUBSEQUENT TO SECOND CHART

NORMAL PRINT MODE

- SET COLOR CORRECTION PARAMETERS OF FIRST CHART FOR COLOR CORRECTION AT THE TIME OF PRINTING FIRST CHART FROM PAUSE STATE
- FOR TEST CHART SUBSEQUENT TO SECOND CHART, SET COLOR CORRECTION PARAMETERS OF SECOND CHART FOR COLOR CORRECTION

FIRST COLOR  SECOND COLOR  GROUND

COLOR COMPENSATING METHOD OF COLOR IMAGE AND COLOR IMAGE GENERATING APPARATUS

BACKGROUND OF THE INVENTION

The present invention relates to a color image generating apparatus wherein a plurality of color materials are overlapped to form a multicolor image and more particularly, to a color image generating apparatus which has a function of correcting color drifts caused by different apparatuses, change with time or environmental change and which can suitably perform color correction over the color drifts different in continuous and non-continuous print modes, and also to a color correcting method for the apparatus.

A conventional color image generating apparatus is designed to overlap a plurality of color materials, e.g., yellow (Y), magenta (M) and cyan (C) or Y, M, C and black (K) to realize multicolor reproduction. In such a color image generating apparatus, the gamma characteristics of the respective colors are changed by the environmental change or time change or color change takes place due to overlap deviation, which makes it difficult to control the color reproduction. Further, when an identical type of different apparatuses are used to form an identical image, the images obtained by these apparatuses are different in color balance. Furthermore, these apparatuses, in some cases, produce different gamma characteristics and overlap deviations in a record start mode and in a continuous record mode.

In order to avoid such problems, there has been conventionally proposed a method in which a color palette is printed and measured by a color line sensor, a color correction masking matrix is arranged so that differences between a lot of input density data and output density data become minimum to thereby realize color correction.

Further, a color copying machine is designed to read a color palette by a reader to measure a change in the color reproduction characteristic of an output device for establishing the color balance or to perform masking color correction, which is disclosed in JP-A-3-262273.

A method for correcting color drift itself is also known in which a mark is provided at a predetermined position of a photosensitive body to detect a positional displacement, a laser irradiation start position is shifted in a main-scan direction, a driving device is controlled to shift the phase of a photosensitive drum or photosensitive belt, or the spot position of laser beam is changed by an actuator. This method is disclosed in JP-A-5-150606.

In one of the above prior art methods which read a color palette using a color line sensor or a color scanner to perform masking color correction, it is necessary to record and measure a lot of samples. When the number of measurements is small, this method becomes small in precision.

The other prior art method for applying a mark at a predetermined position on the photosensitive body or intermediate transfer body is valid when the photosensitive body or intermediate transfer body is driven at a constant speed or overlapping phase is adjusted. However, when such a body is driven in a zig-zag manner or at a varying velocity, it is impossible to positively grasp an overlap deviation tendency on paper sheet because it is based on the timing of the single point.

The method for controlling the laser irradiation start position with use of the actuator has a problem that the number of necessary parts is increased and control performance is deteriorated.

In the prior art, in addition, the overlap deviation or color density in the continuous print mode is different from that when printing is started after paused for a while, which causes fluctuation of a color drift. The prior art fails to take it into consideration.

SUMMARY OF THE INVENTION

It is therefore an object of the present invention to provide a color image generating apparatus which can correct a color drift caused by different apparatuses, time change or environmental change to realize stable color reproduction, and also to provide a color correcting method for the apparatus.

The above object is attained by estimating an overlap deviation from a hue value of a test pattern of 2-color combinations and correspondingly correcting a record start position. More specifically, this includes aspects of the present invention which follow.

(1) There is provided a color correcting method for a color image generating apparatus in which a test pattern is printed in combinations of two of colors used for formation of color image and a record start position of image generating means is controlled according to a record position displacement estimated from a hue value of the pattern.

(2) There is provided a color correcting method for a color image generating apparatus for overlapping 3 or 4 color materials according to color image data of 3 separated colors of yellow (Y), magenta (M) and cyan (C) or of 4 separated colors of Y, M, C and black (K) to obtain a multicolor image, wherein a test pattern is printed in a vertical/horizontal stripe form of 2-color combinations of 2 of the 3 or 4 colors and is measured by a color detector to find a hue value, a relative overlap deviation of the Y, M, C or Y, M, C, K is calculated from the found hue value, and a record start position of image generating means in a main-scan direction and a record start position in a feed direction are controlled to correct the relative overlap deviation.

(3) There is provided a color correcting method for a color image generating apparatus for overlapping 3 or 4 color materials according to color image data of 3 separated colors of yellow (Y), magenta (X) and cyan (C) or of 4 separated colors of Y, M, C and black (K) to obtain a multicolor image, wherein a test pattern in a vertical/horizontal stripe form of 2-color combinations of 2 of the 3 or 4 colors or a grid test pattern is printed and is measured by a color detector to find a hue value, a color drift of the Y, M, C or Y, M, C, K is calculated from the found hue value, a color correction coefficient or one of a plurality of color correction tables previously prepared for overlap deviations corresponding to the color drift is selected and set in color correcting means for color correction.

(4) In the aspect (3), when the color correction table is prepared, a color reproduction model using a correction term associated with the color drift is used, a correction is determined by the hue data measured by the color detector, and the color correction table is prepared based on the color reproduction model.

(5) There is provided a color correcting method for a color image generating apparatus for overlapping 3 or 4 color materials according to color image data of 3 separated colors of yellow (Y), magenta (M) and cyan (C) or of 4 separated colors of Y, M, C and black (K) to obtain a multicolor image, wherein a test pattern is printed in a vertical/horizontal stripe form of 2-color combinations of 2 of the 3 or 4 colors and is measured by a color detector to find a hue value, a relative overlap deviation of the Y, M, C or Y, M, C, K is calculated from the found hue value, a record start position of image generating means in a main-scan direction and a record start position in a feed direction are controlled and corrected, after which another test pattern is again printed and measured by the color detector to find a hue value, and a color correction coefficient or a color correction table corresponding to the hue value is set in color correcting means for color correction.

(6) In any of the aspects (1), (2), (3) and (5), the test pattern of 2-color combinations of 2 of the 3 or 4 colors is prepared two or more.

(7) There is provided a color correcting method for a color image generating apparatus for overlapping 3 or 4 color materials according to color image data of 3 separated colors of yellow (Y), magenta (M) and cyan (C) or of 4 separated colors of Y, M, C and black (K) to obtain a multicolor image, wherein a reference color palette is printed on paper sheet or OHP sheet and measured by a color detector to find saturation and lightness values, and an ink fixing temperature is controlled according to the found saturation and lightness values.

(8) There is provided a color correcting method for a color image generating apparatus for overlapping 4 color materials to obtain a multicolor image according to color image data of 4 separated colors of Y, M, C and K, wherein color correction tables showing under-color removal associated with black ink addition are previously prepared and one of the tables is selected according to the under-color removal and black ink addition determined by user's operation for color correction.

(9) In the aspect (8), the color correction tables showing under-color removal associated with black ink addition are prepared with use of a color reproduction model.

(10) Previously-measured hue data of white ground of a plurality of paper sheets are associated with white ground data for color correction, one of the hue data of the white ground of the plurality of paper sheets closest to read data of white ground of a paper sheet used in the apparatus is selected, a color correction matrix or a color correction table calculated using the selected hue data or one of color correction tables previously prepared for a plurality of overlap deviations is selected for color correction.

Further, the above object is attained by providing apparatuses or printers which have arrangements which follow.

(11) There is provided a color image generating apparatus for overlapping 3 or 4 color materials to obtain a multicolor image according to color image data of 3 separated colors of yellow (Y), magenta (M) and cyan (C) or of 4 separated colors of Y, M, C and black (K), wherein color correction of the color image to be formed on a recording medium is carried out by any of the aspects (1) to (10).

(12) There is provided a color laser beam printer which comprises video signal generating means for generating a video signal of image data; means for generating a laser beam modulated with the video signal; means for scanning the laser beam in a width direction of a photosensitive body; developing means for sequentially forming electrostatic latent images of colors on the photosensitive body by the scanned laser beam and sequentially developing the formed electrostatic latent images with use of toners corresponding to the colors; means for collectively transferring onto a recording medium the toner images of the respective colors formed on the photosensitive body; and means for fixing the toner images transferred onto the recording medium, wherein a test pattern including a plurality of patterns of 2-color combinations of 4 colors of yellow (Y), magenta (M), cyan (C) and relatively overlapped is recorded and detected by a color detector with respect to a hue value, a relative overlap deviation of the colors Y, M, C and K is calculated based on a variation in the hue value, and color correction is carried out based on a laser irradiation start position or a color correction table or based on a combination of the laser irradiation start position and color correction table.

(13) There is provided a color laser beam printer which comprises video signal generating means for generating a video signal of image data; means for generating a laser beam modulated with the video signal; means for scanning the laser beam in a width direction of a photosensitive body; developing means for sequentially forming electrostatic latent images of colors on the photosensitive body by the scanned laser beam and sequentially developing the formed electrostatic latent images with use of toners corresponding to the colors; intermediate transfer means for sequentially overlapping the toner images of the respective colors to form a blended-color toner image; means for collectively transferring onto a recording medium the toner images of the respective colors formed on the intermediate transfer means; and means for fixing the toner images transferred onto the recording medium, and wherein a test pattern of 2-color combinations of 4 colors of yellow (Y), magenta (M), cyan (C) and black (K) and relatively overlapped is recorded and detected by a color detector installed close to a surface of the intermediate transfer means with respect to a hue value, a relative overlap deviation of the colors Y, M, C and K is calculated based on a variation in the hue value, and color correction is carried out based on a laser irradiation start position or a color correction table or based on a combination of the laser irradiation start position and color correction table.

(14) There is provided a color ink jet printer having line heads for 3 or 4 colors, wherein a color detector is provided in the vicinity of an output part of the printer, a test pattern of 2-color combinations arranged in a stripe form is printed and measured by the color detector to find a hue value, a relative overlap deviation of 3 colors of yellow (Y), magenta (M) and cyan (C) or of 4 colors of yellow (Y), magenta (M), cyan (C) and black (K) is calculated from the found hue value, and record start timing of the line heads is controlled to correct the relative overlap deviation.

(15) There is provided a color ink jet printer having line heads for 3 or 4 colors, wherein a color detector is provided in the vicinity of an output part of the printer, a test pattern of 2-color combinations arranged in a stripe form or a dot pattern is printed and measured by the color detector to find a hue value, a relative overlap deviation of 3 colors of yellow (Y), magenta (M) and cyan (C) or of 4 colors of yellow (Y), magenta (M), cyan (C) and black (K) is calculated from the found hue value, and a corresponding color correction table is set in color correcting means to correct a color drift caused by the relative overlap deviation.

The color image generating apparatus has a color drift correction mode. The color image generating apparatus enters into the color drift mode, in the event the user observes a color drift and issues an instruction to the color image generating apparatus to correct the color drift, when color detecting means always detects the color of the printed result of the apparatus and judges a color drift, or when the power supply of the color image generating apparatus is started or turned on. Some such apparatuses always perform color correction at the time of turning on their power supply. In this case, in the color correction mode, a test pattern of overlapped 2-color combinations is generated, recorded and printed, the color thereof is detected by color detecting means, the hue, saturation and lightness values are found based on the detected color, and the overlap deviation, color drift and reduction of light transmission factor are corrected based on deviations in the hue, saturation and lightness values from their reference values.

In the test pattern arranged in overlapped 2-color combinations, overlapping positions are shifted from the beginning so that, when the characteristic of the color image generating apparatus is shifted upward, downward, leftward or rightward, the hue varies from a predetermined hue value. Accordingly, when relationships of hues with respect to shifts are previously set in the form of a table, an overlap deviation can be estimated from the hue value.

The color detecting means detects the color of the test pattern recorded on the intermediate transfer body having a ground color and the color of the test pattern recorded on the photosensitive body having a ground color.

On the intermediate transfer body or photosensitive body, in particular, since toners do not melt mixedly, color is generated by a combination of light reflected from the toner extruded from the bottom of the body and reflected from the toner covering the underlying toner and the ground color of the body. Since the toner surface on the intermediate transfer body or photosensitive body is uneven, light is scattered thereon. Thus, the light receiver is of a type which can suitably receive the scattered light.

The calibration of the color detecting means for detecting the color of the test pattern recorded on a paper sheet is carried out with use of light reflected from the ambient environment when the sheet is not passed yet or light transmitted therethrough. The calibration of the color detecting means for detecting the color of the test pattern recorded on the intermediate transfer body or photosensitive body is carried out with use of the ground color when toners are not carried thereon. When the ground color is unstable, the calibration is effected based on toners coated and recorded over a wide range of area in the body.

The means for controlling the main-scan directional record start position divides a laser beam detection signal from a beam detector with a clock to generate several phase signals, and selects one of the phase signals associated with the overlap deviation for the position control.

The means for controlling the feed-directional record start position controls the phase of the motor for driving the photosensitive body to correct the overlap deviation.

The color correcting means selects one of color correction coefficients or color correction tables previously calculated associated with color drifts to perform color correction. In this connection, the color correction coefficients or color correction tables associated with the color drifts can be automatically made with use of a color reproduction model taking color change caused by color drift into consideration and using the color correction tables associated with the color drifts for the color reproduction model.

The fixing means transmits heat to toners to melt the toners and to enhance its light transmission factor. The toner melting degree varies depending on the fixing temperature of the fixing means and thus the saturation and lightness of the printed result also vary. The low fixing temperature causes less mixedly melting of toners and more irregular reflection. The high fixing temperature, on the other hand, causes more mixedly melting of toners, with the result that the toners flow and evaporate. To avoid this, the reference color palette is printed on paper sheet or OHP sheet and measured by the color detecting means to find saturation and lightness values, and the fixing temperature of the fixing means is controlled based on the found saturation and lightness values.

Another object of the present invention is to provide a color image generating apparatus which varies a laser irradiation start position or color correction in continuous and non-continuous print modes on the basis of a color drift tendency to obtain always stable color reproduction.

The above object is attained by providing a color image generating apparatus which comprises color drift detecting means for monitoring an overlap deviation of a plurality of colors or a transfer density; operating means for finding a variation tendency in the overlap deviation or transfer density when a plurality of sheets are printed; and color correcting means for performing color correcting operation on the basis of the variation tendency.

More specifically, in accordance with an aspect of the present invention, there is provided a color image generating apparatus wherein a laser beam or LED light modulated with an electric signal indicative of color information on a color image is scanned in a width direction of a photosensitive body to sequentially form electrostatic latent images of different colors thereon, the formed electrostatic latent images of the colors are sequentially developed with use of toners of the corresponding colors, the developed toner images of the colors are sequentially overlapped to form a blended-color toner image on intermediate transfer means, and the formed toner images of the colors are collectively transferred and fixed onto a recording medium, the apparatus further comprising means for detecting a color drift at the time of overlapping and recording the colors; means for finding a color drift tendency when a plurality of sheets are printed on the basis of data from the detecting means; and means for correcting the each color drift on the basis of the color drift tendency.

Further, in accordance with another aspect of the present invention, there is provided a color image generating apparatus which comprises video signal generating means for generating a video signal of image data; means for generating a laser beam modulated with the video signal; means for scanning the laser beam in a width direction of a photosensitive body; developing means for sequentially forming electrostatic latent images of colors on the photosensitive body by the scanned laser beam and sequentially developing the formed electrostatic latent images with use of toners corresponding to the colors; intermediate transfer means for sequentially overlapping the toner images of the respective colors to form a blended-color toner image; means for collectively transferring onto a recording medium the toner images of the respective colors formed on the intermediate transfer means; and means for fixing the toner images transferred onto the recording medium, the apparatus further comprising means for detecting a color drift at the time of overlapping and recording the colors; means for finding a color drift tendency when a plurality of sheets are recorded on the basis of data from the detecting means; a memory for storing therein the color drift tendency; and means for correcting each color drift on the basis of the color drift tendency stored in the memory.

In accordance with a further aspect of the present invention, there is provided a color image generating apparatus which comprises video signal generating means for generating a video signal of image data; means for generating a laser beam modulated with the video signal; means for scanning the laser beam in a width direction of a photosensitive body; developing means for sequentially forming electrostatic latent images of colors on the photosensitive body by the scanned laser beam and sequentially developing the formed electrostatic latent images with use of toners corresponding to the colors; intermediate transfer means for sequentially overlapping the toner images of the respective colors to form a blended-color toner image; means for collectively transferring onto a recording medium the toner images of the respective colors formed on the intermediate transfer means; and means for fixing the toner images transferred onto the recording medium, or there is provided a color image generating apparatus wherein toner images of the colors formed on the photosensitive body are sequentially shifted onto intermediate transfer means and the toner images of the respective colors formed on the intermediate transfer means are collectively transferred onto a recording medium; wherein color drift tendencies caused by the overlapped colors when a plurality of sheets are recorded and are previously measured by color drift detecting means externally installed at the time of manufacturing the apparatus and correction values are set to correct the respective color drifts according to the respective color drift tendencies.

In some cases, the rotational position of the photosensitive body or transfer body of the color image generating apparatus in the continuous print mode may become different from that in the non-continuous print mode, which causes change of the record start position in the main-scan or feed directions. Further, the toner density may vary between the continuous and non-continuous print modes.

With such arrangements as mentioned above, the overlap deviation or transfer density of, e.g., colors Y, M, C and K are monitored by the color drift detector to find overlap deviation and transfer variation tendencies in the continuous and non-continuous print modes at the arithmetic unit, and the color correcting operation associated with the color drift is realized according to these variation tendencies, e.g., by adjusting the laser irradiation start position. Further, the color correction can be easily carried out by previously storing color drift tendencies in the memory or by setting color drift correction values at the time of manufacturing the apparatus.

BRIEF DESCRIPTION OF THE DRAWINGS

FIG. 40 is a flowchart showing another example of a color drift correction data creation mode;

DESCRIPTION OF THE PREFERRED EMBODIMENTS

Figure 1:
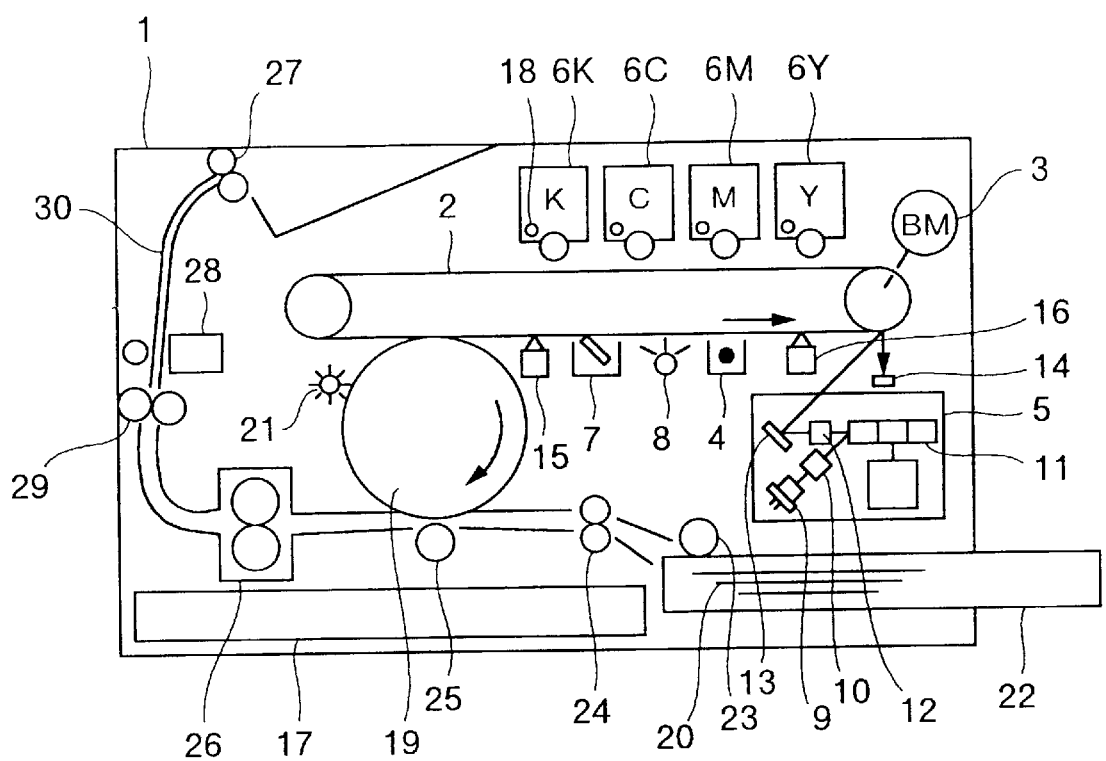
FIG. 1 schematically shows a color image generating apparatus in accordance with an embodiment of the present invention.

The present invention will be detailed by referring to the accompanying drawings. Referring first to FIG. 1, there is shown a cross-sectional view of an entire arrangement of a color laser beam printer 1 used for explaining an embodiment of the present invention. A printing section of the color laser beam printer 1 includes a photosensitive belt 2, a belt driving motor 3 for rotating the photosensitive belt 2, a charger 4 for uniformly charging a surface of the photosensitive belt 2, a scanning/exposing unit 5 for subjecting the uniformly-charged surface of the photosensitive belt 2 to light exposure to form electrostatic latent images on the surface, 4 developing units 6Y, 6M, 6C and 6K for developing the electrostatic latent images to form respective color toner images thereon, a cleaner 7 for removing toners remaining on the surface of the photosensitive belt after the toner images have been transferred, and an erase lamp 8 for removing electric charges remaining on the surface of the photosensitive belt.

In the scanning/exposing unit 5, laser light issued from a semiconductor laser 9 is converged through a condenser 10 to form a collimated or parallel laser beam which is then repetitively reflected by a polygon mirror 11 to obtain a deflection beam. The deflection beam is irradiated on the surface of the photosensitive belt 2 through a projecting lens 12 and a folding antenna 13 to form a beam spot on the surface of the photosensitive belt 2. Then the beam spot is scanned to expose the surface of the photosensitive belt. As shown in FIG. 1, the scanning/exposing unit 5 has a beam detector 14 which detects the timing when the beam spot passes through a deflection scan start reference position in each deflection scan direction (drum axial direction) and outputs an output signal as a deflection scan start reference signal BDT.

The photosensitive belt 2 is provided on its outer peripheral surface with a reference position mark so that a feed-scan reference position detector 15 (reflective photosensor) reads the mark and generates a reference position signal TPS in a feed direction (paper sheet pass or feed direction). A variation in the speed of the photosensitive belt is detected on the basis of the output of the feed-scan reference position detector 15 to control the belt driving motor 3 in such a manner that the variation is removed so that the belt can run always at a predetermined velocity.

And the laser beam causes Y (yellow), M (magenta), C (cyan) and K (black) electrostatic latent images to be formed on the belt for every rotation of the belt.

A potential sensor 16, which is located downstream of the charger 4 along the running direction of the photosensitive belt 2, functions to monitor a variation in the potential on the photosensitive belt and on the basis of its monitored result, controls the charger 4 to cause a charged amount on the belt to be constant.

The developing units 6Y, 6M, 6C and 6K use Y, M, C and K toner developing agents respectively, and the developing functions of the units are turned ON and OFF under control of their biasing voltages. The control of the biasing voltages is carried out by means of respective designation signals received from a printer controller 17 so that the developing units 6Y, 6M, 6C and 6K corresponding to designated colors can effectively function.

The developing units 6Y, 6M, 6C and 6K, which have their own toner concentration detectors 18, are controlled by these detectors to have always a constant concentration. The cleaner 7 has a blade therein, which is moved upward and downward in response to its cleaning ON and OFF operation to remove toners remaining on the surface of the photosensitive belt 2.

An intermediate transfer drum 19 overlaps a plurality of toner images formed on the surface of the photosensitive belt to form a single mixed-color toner image and then transfers the mixed-color toner image to a paper sheet 20. The intermediate transfer drum 19 is driven by the belt driving motor 3 as its driving source to be rotated as contacted partly with the photosensitive belt 2 in synchronism with the running surface of the photosensitive belt in such an arrow direction as shown in FIG. 1. Since the intermediate transfer drum 19 is grounded and the photosensitive belt is negatively charged, the toner is transferred to the intermediate transfer drum side. For the purpose of eliminating toners remaining on the surface of the intermediate transfer drum 19, a power brush 21 is disposed on the surface of the intermediate transfer drum 19 to be contacted with and released from the drum.

A cassette 22 accommodates stacked paper sheets on the top of which is the paper sheet 20, while a paper feed roller 23 release the paper sheet 20 from the stack and supplies it up to a register roller 24. The register roller 24 suppresses the paper sheet 20 fed from the paper feed roller 23 at its tip end to stop advancement of the paper sheet 20 and to register the paper and then adjust its paper feed timing.

A paper transfer roller 25 pushes, at its contact area with the intermediate transfer drum 19, the paper sheet 20 fed from the register roller 24 against the intermediate transfer drum 19 to transfer the toner image on the surface of the intermediate transfer drum onto the paper sheet 20.

A fixing unit 26, which incorporates heating and press rollers, passes the paper sheet 20 having the toner image thereon through these rollers to fix the toner image on the paper sheet 20.

A paper discharging roller 27 acts to externally discharge the paper sheet 20 having the toner image fixed thereon.

The above arrangement enables considerable suppression of overlap deviation of the Y, M, C and K toners and variations in the respective toner transfer amounts thereof. In order to further suppress fluctuations in the color reproduction caused by different machines, environmental change and variation with time, however, overlap deviation correction and color correction are carried out.

Figure 2:
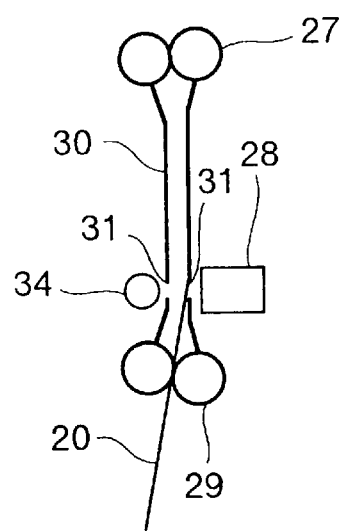
FIG. 2 schematically shows a how a color detector is mounted in the embodiment of the present invention.

A color detector 28 for detecting the color of the toner image fixed to the paper sheet 18 is disposed between the fixing unit 26 and the paper discharging roller 27. Shown in FIG. 2 is how the color detector 28 is disposed. The paper sheet 20, after passing through the fixing unit 26, takes a predetermined course defined by a guide roller 29 and a guide plate 30. The guide plate 30 for guiding the paper sheet 20 is provided nearly in the middle of length of its feed direction with a window 31 through which light strikes the paper sheet 20, so that the color detector 28 receives light reflected by the paper sheet 20 and generates a lightness signal. Although the window 31 has been provided nearly in the middle of the length of the guide plate 30 to cope with any sheet, the window may be provided at a position other than the middle so long as the sheet run along guide surface of the guide plate. In this connection, in order to avoid any reduction of its detection ability caused by dust or sheet particles, the color detector 28 was positioned to detect, from the horizontal direction of the machine, the color of the sheet being fed substantially in the vertical direction.

Figure 3:
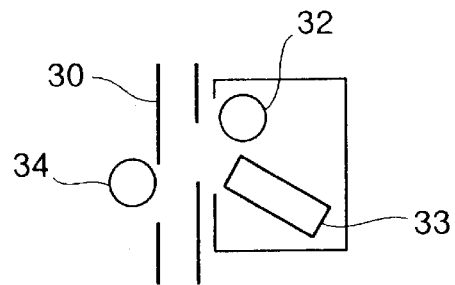
FIG. 3 shows a schematic structure of the color detector for use in the embodiment of the present invention.
Figure 4:
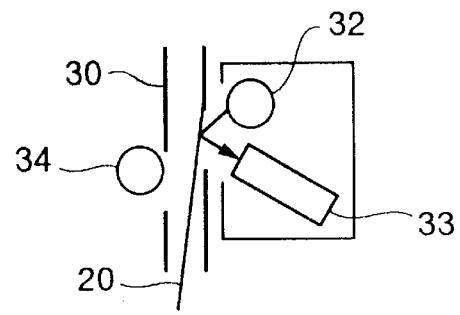
FIG. 4 is a diagram for explaining how the color detector detects sheet color in the embodiment of the present invention.
Figure 6A:
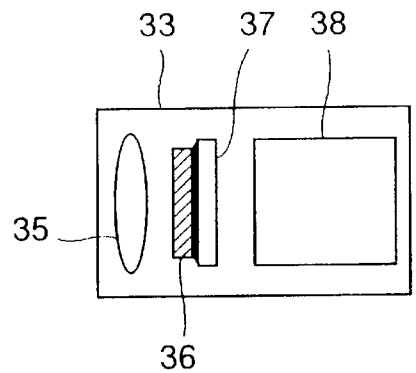
FIGS. 6A and 6B are diagrams for explaining a structure of a color light receiver for use in the embodiment of the present invention.
Figure 6B:
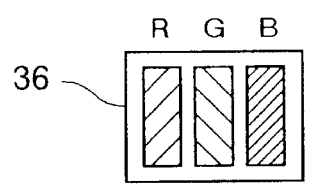
Figure 7:
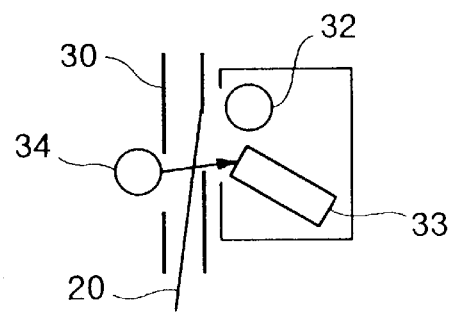
FIG. 7 is a diagram for explaining how the color detector calibrates a sheet in the embodiment of the present invention.

FIG. 3 shows a structure of the color detector which is made up of a light source 32 for reflection, a light source 34 for light transmission and a color light receiver 33 for receiving light from these light sources. In order to see reflected light or in the case of paper sheet, the reflecting light source 32 is combined with the color light receiver 33 as shown in FIG. 4; whereas, in order to see transmitted light or in the case of OHP sheet, the transmitting light source 34 is combined with the color light receiver 33 as shown in FIG. 7. The color light receiver 33 includes, as shown in FIGS. 6A and 6B, a light collecting lens or condenser 35, a color filter 36 corresponding to a combination of red (R), green (G) and blue (B) filters, a light receiver 37 having spectral sensitivity characteristics of visible light range, and a control circuit 38. The color filter may include a filter other than the R, G and B filters.

Figure 5:
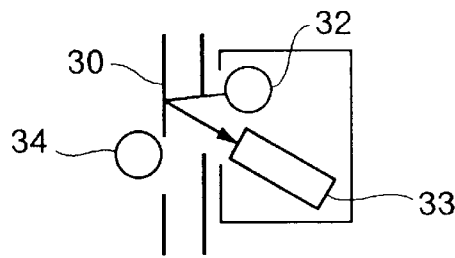
FIG. 5 is a diagram for explaining how the color detector detects color of OHP (overhead projector) sheet in the embodiment of the present invention.

The calibration of the color detector 28 is carried out as shown in FIG. 5 by the color light receiver 33 receiving light issued from the reflecting light source 32 and reflected by the guide plate 30 in the absence of any paper sheet being passed therethrough to obtain a lightness signal to correct the light quantity or received light gain of the reflecting light source 32 of the color detector 28 on the basis of the lightness signal. Alternatively, the calibration may be carried out by rewriting a calibration table incorporated in the color detector 28 to issue a predetermined signal.

The color detector 28 may comprise a CCD sensor array or may be a combination of 3 color light sources and a light receiver to obtain a color signal.

Figure 8:
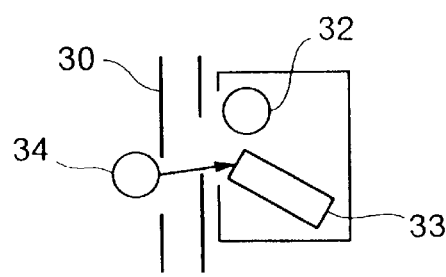
FIG. 8 is a diagram for explaining how the color detector calibrates an OHP sheet in the embodiment of the present invention.

In the case of the OHP sheet, the transmitting light source 34 is disposed as opposed to the color light receiver 33 to read transmitted light as shown in FIG. 7. Information on the palette colors can be obtained based on positional information of a color palette printed after the tip end of the OHP sheet was detected. The calibration of the color detector associated with the OHP sheet is carried out as shown in FIG. 8 by turning ON the transmitting light source 34 and by correcting an output of the color light receiver 33 receiving light from the light source 34 in the absence of OHP sheet not passing through the guide plate 30 to have a predetermined value, or by rewriting the value of a calibration table.

Figure 9:
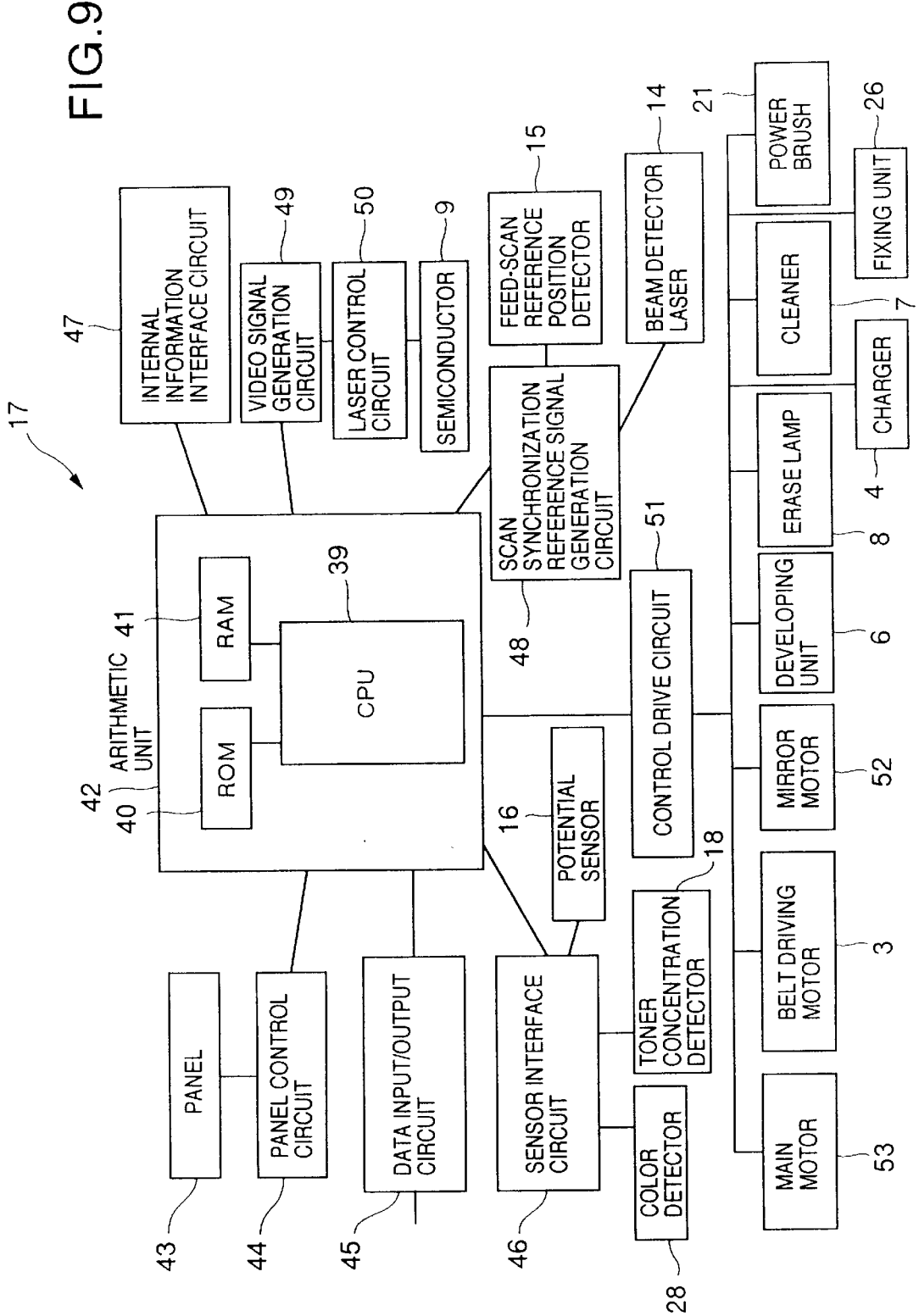
FIG. 9 shows an arrangement of a printer controller for use in the embodiment of the present invention for explaining print control operation.

The printer controller 17 performs transfer of various sorts of data through a serial or parallel interface from an external device such as a host computer or a color scanner and controls constituent means in the interior of the color laser beam printer to execute its printing control operation. The structure of the printer controller 17 is shown in FIG. 9.

More in detail, the printer controller 17 includes an arithmetic unit 42 having a CPU 39, a ROM 40 for storing therein a program and test print data and a RAM 41 for storing therein error information, maintenance information, etc.; a panel control circuit 44 for performing transfer of operational display information of a panel 43 therewith; a data input/output circuit 45 for performing transfer of various sorts of data from and to external devices; a sensor interface circuit 46 for receiving a signal from the color detector 28 and a signal from the toner concentration detector 18; an internal information interface circuit 47 for performing transfer of various sorts of internal settings and error information; a scan synchronization reference signal generation circuit 48 for generating a scan synchronization reference signal based on a deflection scan start reference detection signal received from the beam detector 14 and a reference position signal in the sub-scanning or feed direction received from the feed-scan reference position detector 15; a video signal generation circuit 49; a laser control circuit 50 for controlling the turning ON and OFF operation of the semiconductor laser 9; and a control drive circuit 51 for controlling the constituent means of interior of the laser printer.

The constituent means of interior of the printer include a mirror motor 52 for driving the polygon mirror 11, a main motor 53 for driving a paper feed system, the earlier-mentioned belt driving motor 3 for running the photosensitive belt 2, the earlier-mentioned charger 4, developing unit 6, cleaner 7, erase lamp 8, power brush 21 and fixing unit 26.

Figure 10:
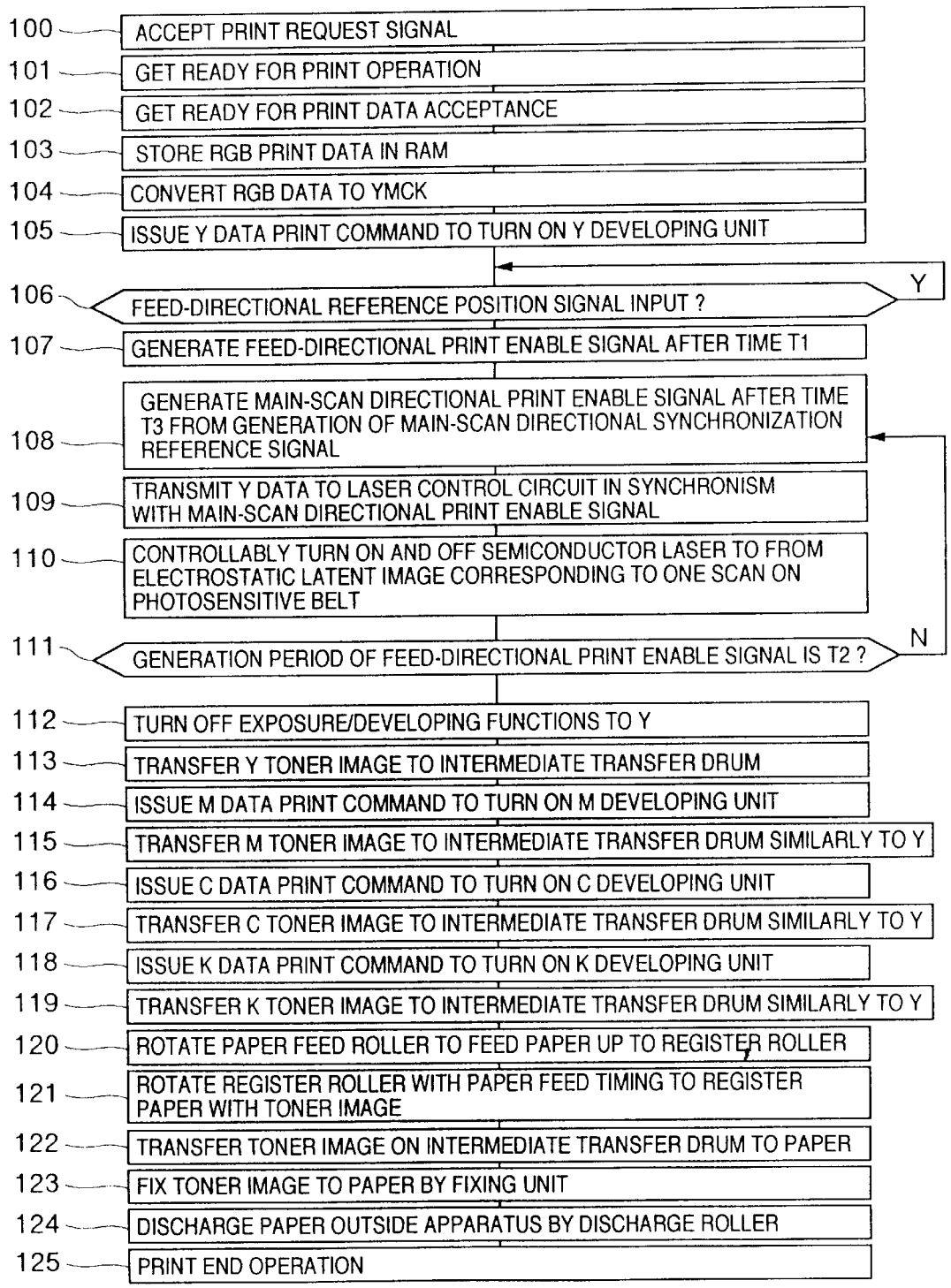
FIG. 10 is a flow chart showing a flow of color image data processing in the embodiment of the present invention.

Explanation will next be made as to the print control operation executed by the CPU with reference to FIG. 10. When the printer controller 17 receives a print request signal from outside of the printer controller through the panel 43 or data input/output circuit 45, the printer controller carries out its print control operation in accordance with a control program stored in the ROM 40 (step 100).

In a step 101, the CPU 39 causes the main motor 53, mirror motor 52 and belt driving motor 3 to be rotated and the erase lamp 8 to be turned ON to put the charger 4 in its operative state.

In a step 102, the CPU 39 informs an upper-level device the CPU got ready for receiving color data, receives the data through the interface, and in a step 103, stores it in the RAM 41. Since the color image data received from the upper-level device is usually described in the sequence of dots R, G and B, the CPU converts the dot sequence into surface sequence of print data YMCK (step 104).

In a step 105, the CPU issues a command for print of Y data to make the Y developing unit 6 effective. In a step 106, the CPU monitors input of the reference position signal in the feed direction of the surface of the photosensitive belt, and, when the photosensitive belt 2 is driven up to a write reference position to thereby generate the feed-direction reference position signal TPS, shifts the current operation to the next operation.

In a step 107, the CPU performs its time managing operation to cause generation of a print enable signal V a time T1 after the reference position signal TPS is generated. That is, after the time T1, the CPU controls to cause generation of the feed-direction print enable signal V. The time management is carried out by counting the main-scan synchronization reference signal BDT. A length T2 of generation duration of the feed-directional print enable signal V corresponds to a time during which the paper sheet is fed by its feed-directional length.

In the generation period of the feed-directional print enable signal V, the CPU first carries out the time managing operation to generate a main-scan directional print enable signal H a time T3 after the generation of the main-scan synchronization reference signal BDT, that is, generates the main-scan directional print enable signal H after passage of the time T3, in a step 108. A length T4 of generation duration of the main-scan directional print enable signal H corresponds to a time during which the paper sheet is scanned along its width directional print zone.

Thereafter, control shifts to a step 109 in which the CPU receives the Y data in synchronism with the print enable signal V and send it to the video signal generation circuit 49 to control the turning ON and OFF of the semiconductor laser 9. The control of the turning ON and OFF of the semiconductor laser results in that an electrostatic latent image corresponding to one scanning line is formed on the surface of the photosensitive belt (step 110).

In a next step 111, the CPU checks whether or not the generation duration of the feed-scan directional print enable signal V is within the time T2. If the judgement is YES, then the CPU monitors the generation of the main-scan synchronization reference signal BDT and, when the next main-scan synchronization reference signal BDT is generated, shifts its current operation to the next operation.

The termination of the generation duration of the signal V causes control to go to a step 112 where the CPU returns the print enable signal V to its low level to complete the Y light exposure and then controls the development biasing voltage to vanish the developing function. The toner image of the color Y thus formed is transferred thereto and kept on the surface of the intermediate transfer drum 19 as the image comes into contact with the intermediate transfer drum (step 113).

Next, the CPU issues a command for printing of M data to activate the M developing unit 6M (step 114). Similarly to the Y printing operation, the M toner image is overlapped on the surface of the intermediate transfer drum 19 (step 115). The CPU then issues a command for printing of C data to activate the C developing unit 6C (step 116). As in the Y printing operation, the C toner image is overlapped on the surface of the intermediate transfer drum 19 (step 117). Finally, the CPU issues a command for printing of K data to activate the K developing unit 6K (step 118). As in the Y printing operation, the K toner image is overlapped on the surface of the intermediate transfer drum 19 (step 119).

In a step 120, in order to transfer the toner images thus formed on the surface of the intermediate transfer drum 19 onto a paper sheet, the paper feed roller 23 is rotated to feed the paper sheet up to the register roller 24. And in order to register the paper sheet with the toner images, the register roller 24 starts its rotation in synchronism with such timing that the paper sheet comes into contact with the intermediate transfer drum 19. In a step 121, the paper sheet is fed in such timing as to come into contact with the register roller 24 to cause the toner images on the intermediate transfer drum to be electrostatically transferred onto the sheet (step 122).

In this way, the color toner images are transferred onto the paper sheet, and are fixed on the sheet as the sheet having the toner images transferred thereonto passes through the fixing unit 26 (step 123). And the resultant paper sheet is externally discharged from the paper discharging roller 27 (step 124).

In a step 125, print terminating operation is carried out. More in detail, the register roller 24 after finishing its sheet feeding operation is stopped in its rotation, the power brush 21 is started to remove toners still remaining on the surface of the intermediate transfer drum after finishing its transferring operation, power supply is stopped to the charger 4 after finishing its charging operation, the erase lamp 8 after finishing the remaining charge removal is turned off, the cleaner 7 after finishing its remaining toner removing operation is released from the surface of the photosensitive belt, and finally all the motors are stopped.

Figure 11:
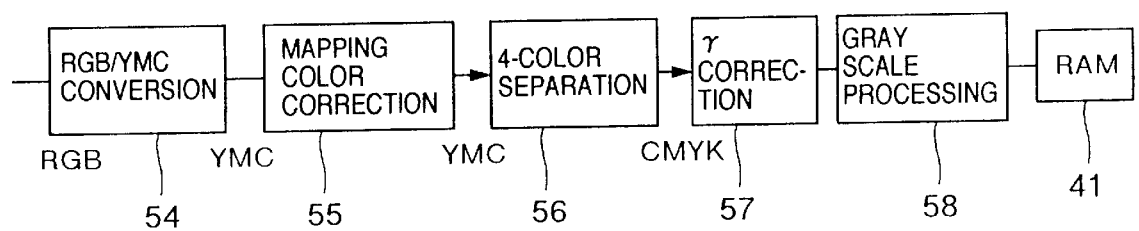
FIG. 11 is a block diagram of a flow of converting operations from red, green and blue (RGB) to print data YMCK in the embodiment of the present invention.

A flow of operations for converting the data RGB to the print data YMCK in the step 104 is shown in FIG. 11. More specifically, in a step 54, first, conversion is carried out from input RGB data to standard YMC data acceptable by a printer (RGB-YMC conversion). The YMC data is subjected in a step 54 to a color correcting operation taking the blended color of the printer into consideration (color correction). In a step 56, color K data is extracted from the YMC data subjected to the color correction to obtain 4 separated color data Y, M, C and K (4-color separation).

The 4 color data Y, M, C and K are subjected in a step 57 respectively to a gamma correction (gamma correction). In a step 58, the data Y, M, C and K subjected to the gamma correction are converted to binary or multi-valued data (half tone processing).

The results subjected to the half tone processing may be sent to the laser on a real time basis but are usually once stored in the RAM 41. Print data is sent to the semiconductor laser 9 from the RAM 41 in synchronism with the printing operation.

In the aforementioned 4-color separation, in general, K component is extracted from Y, M and C, part of the K component is defined as a black ink addition, and data YMC are defined as Y, M and C minus (black ink addition multiplied by a predetermined value) (under-color removal). Which is expressed as follows.

$$K = \min(Y, M, C) - a > 0 \qquad \text{(Equation 1)}$$

$$Y = Y - b \cdot K, \quad M = M - b \cdot K, \quad C = C - b \cdot K$$

Some black inking, under-color removal conditions with varied quantities a and b are previously prepared for user's selection.

The above gamma correction (step 57) is carried out with use of a gamma correction table so that a color image generating apparatus has a predetermined gamma characteristic. Some of such reference gamma correction tables for gamma correction are previously prepared in association with different gray-scale processing methods and different qualities of paper sheets.

When it is judged on the basis of information from the color detector 28 that the detected gamma characteristic value is shifted from the reference gamma value, additional gamma correction is carried out so that the detected gamma characteristic value becomes the reference one.

The color correction (step 55) may be mapping color correction or masking color correction. In the illustrated example, the mapping color correction is effected with use of the color correction table.

Explanation will then be made as to a color drift correction mode when information was obtained telling that a color drift takes place. The color drift correction mode is put active when the user recognizes a color drift and enters an instruction to send a command to the color image generating apparatus and correct the color drift or when the color detector monitors at all times printed results of the color image generating apparatus and finds a color drift. This may be effected at the time of turning on the power supply.

When a color drift is detected from ordinary printed results, information on the color data, half tone processing method and paper sheet in use is previously known. So it is possible to measure the color drift with use of the color detector, so long as an identical color zone is larger than a measurable zone. When it is judged through a plurality of measurements that color change takes place, the CPU enters into the color correction mode. Detection of the color drift through only once measurement is considered that the color drift may occur by accident. To avoid this, the CPU is set to enter into a color drift correction mode through a plurality of measurement results.

Figure 12:
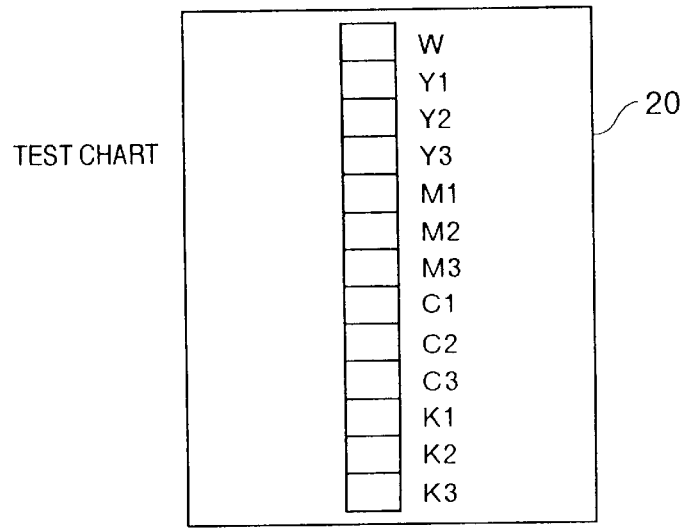
FIG. 12 is a test chart for gamma correction for use in the embodiment of the present invention.
Figure 13:
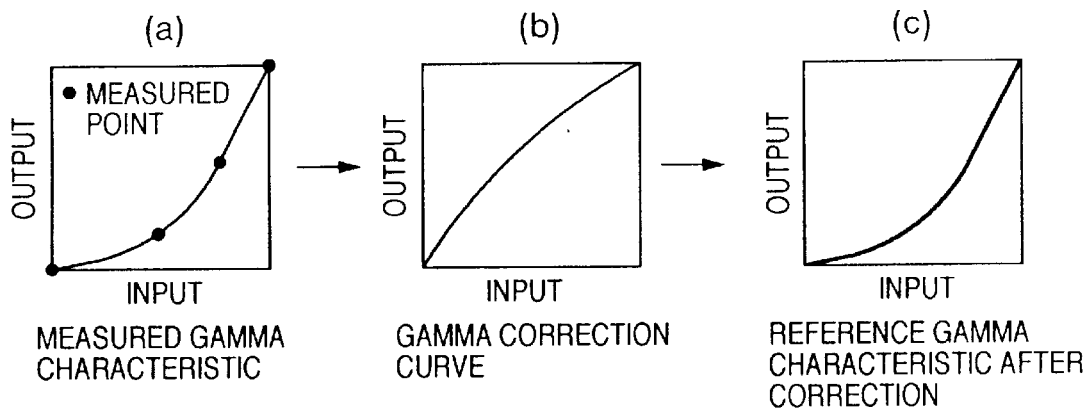
FIG. 13 shows a gamma correction curve for returning a measured gamma curve to a reference gamma curve in the embodiment of the present invention.

The color drift may be caused by changes in the gamma characteristic or overlap deviation. Since the gamma characteristic is controlled to be always constant with use of the potential sensor or toner density detector, the color drift will not be changed to a large extent. However, since a change in the physical characteristics of the paper sheet also causes a change of the gamma characteristic, a test pattern or chart is printed for color measurement. An exemplary test chart is shown in FIG. 12. Since the color detector comprises a spot color sensor in the present embodiment, a half tone palette is made up of colors of white (W) as well as Y, M, C and K arranged in the form of a strip. The colors of the half tone palette are measured by the color detector, changes in the Y, M and C gamma characteristics are known on the basis of the measured color results, and gamma correction is carried out to obtain reference gamma characteristics. FIG. 13, (a), (b) and (c) show how to correct measured gamma characteristic to its reference gamma characteristic. Even when the paper sheet and half tone processing method are changed, the gamma correction can be similarly realized by printing a half tone palette. Changes in the gamma characteristics in another half tone processing method can be estimated by measuring the colors of a half tone palette as a test chart printed through a typical half tone processing method to thereby know changes in the gamma characteristics. That is, a tendency of changes in the gamma characteristics in various sorts of half tone processing methods is previously examined to obtain a relationship or correlation table therebetween. A change in the gamma characteristic in a half tone processing method is estimated with use of such a correlation table.

Figure 14:
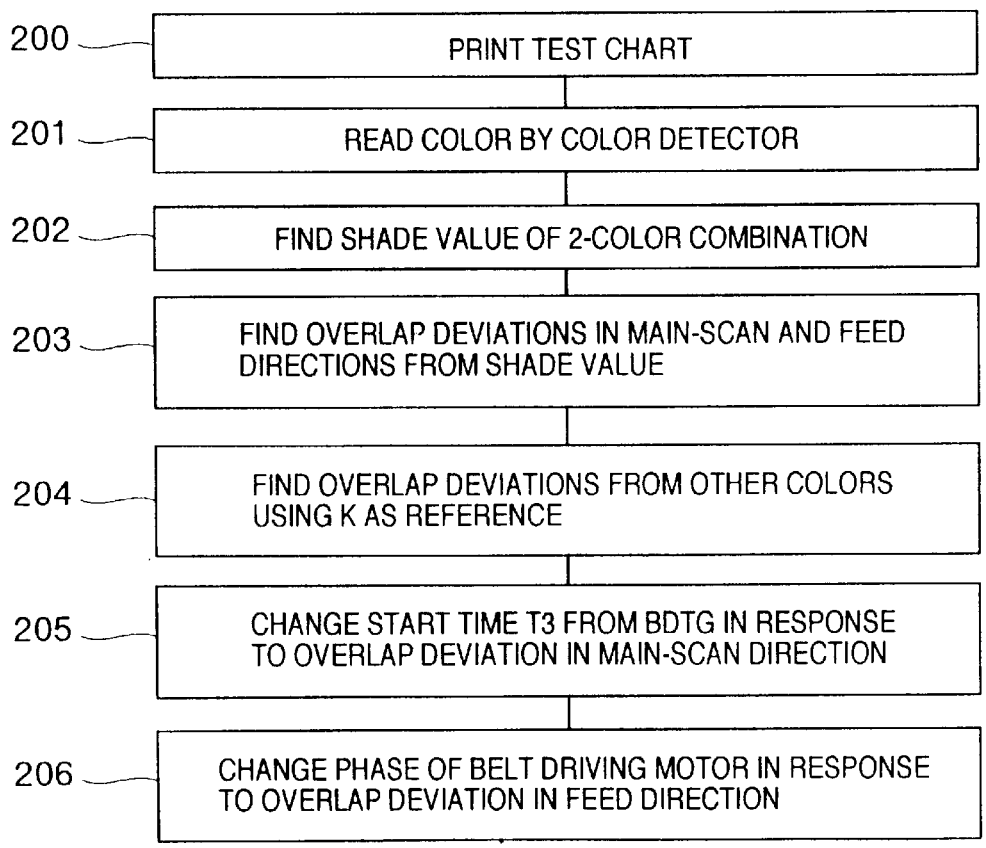
FIG. 14 shows a procedure for correcting overlap deviation in the embodiment of the present invention.
Figure 15:
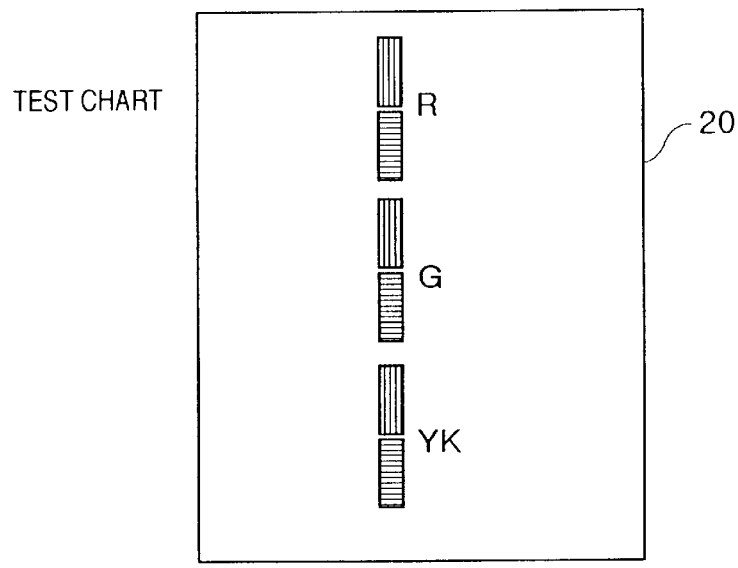
FIG. 15 is a test chart for seeing the overlap deviation in the embodiment of the present invention.

Shown in FIG. 14 is a flowchart for explaining a procedure of correcting overlap deviation. More in detail, such a test chart as shown in FIG. 15 is printed in a step 200. In this test chart, of two-color combinations YM, YC, MC, YK, MK and CK, 3 or more combinations are selected and arranged in the form of a vertical/horizontal stripe to know a relative overlap deviation of 4 colors Y, M, C and K. Since a spot color sensor is used as the color detector in the present embodiment, overlapped 2 colors are alternately positioned horizontally and vertically in the vicinity of the center. When the spot color sensor is used as the color detector, the test chart is made in the form of a strip. The color detector measures the test chart in the vicinity of its center because a measurement distance in the vicinity of the center is constant. If the color at the center is greatly different from that at the end, then the apparatus is faulty and thus it must be repaired before shipping. Accordingly, a result measured at the center can be used as a representative color.

Figure 16A:
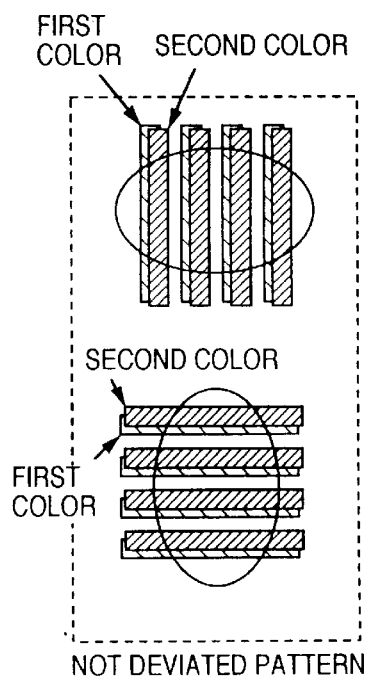
FIGS. 16A and 16B are enlarged diagrams of the test chart of FIG. 15 for explaining a principle of detecting relative overlap deviation.
Figure 16B:
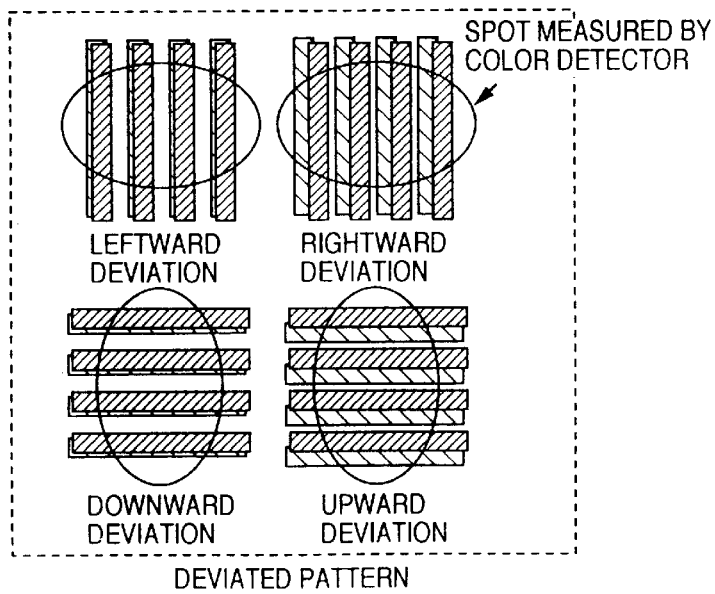

FIGS. 16A and 16B correspond to enlarged views of a part of FIG. 15, showing various sorts of deviation patterns. In this test chart, in order to know that the second color is deviated in which direction, the second color is previously deviated. Further, the test chart is designed so that the second color, even when deviated to its maximum extent, will not come into contact with the next color line. FIG. 16A shows when a printed result has not deviation, while FIG. 16B shows when a printed result has a deviation, that is, the printed result is deviated leftward or downward or rightward or upward. With use of this test pattern, printing is previously carried out with various sorts of overlap deviations and he respective hue values of the printouts are previously measured by the color detector 28.

Figure 17:
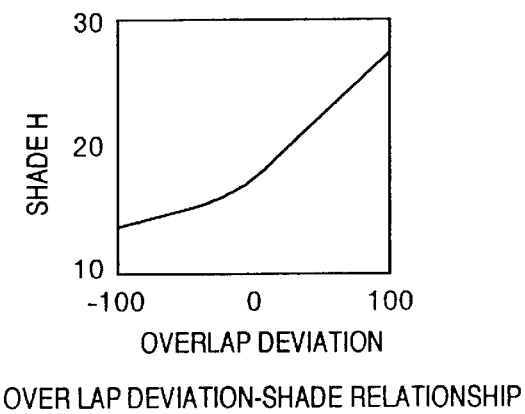
FIG. 17 is a diagram showing a relationship between overlap deviation and hue in the embodiment of the present invention.
Figure 18:
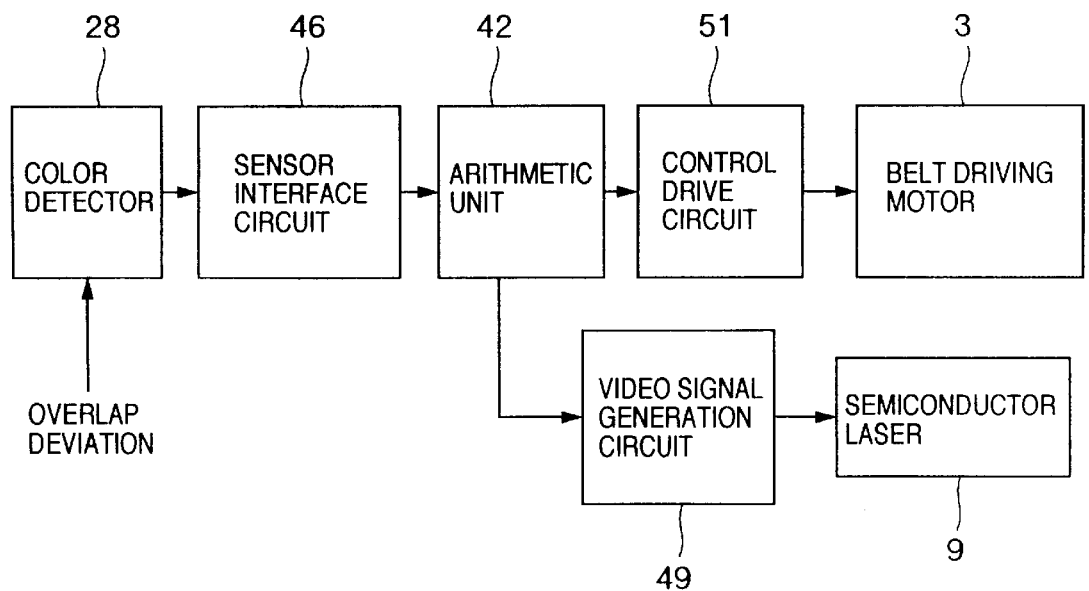
FIG. 18 is a block diagram for correcting the overlap deviation in the embodiment of the present invention.

FIG. 17 is a graph showing a relationship between overlap deviation and hue H. In the step 201 of FIG. 14, the aforementioned test chart is read by the color detector 28 to obtain R, G and B data. The hue H is found from the read R, G and B data (step 202). On the basis of the found hue value deviated from the reference hue value, horizontal and vertical relative overlap deviations are found from FIG. 17 (step 203). Any color can be selected as the reference color. In the illustrated example, color K is selected as the reference color and overlap deviations of the other colors with respect to the reference color K are found (step 204). A deviation in the main scan direction is corrected by controlling a start time T3 from the main-scan synchronization reference signal BDT or by shifting the phase of the main-scan synchronization reference signal BDT (step 205). A deviation in the sub-scan direction is corrected by controlling a print start time T1 from the sub-scan directional reference position signal TPS or by controlling the belt driving motor 3 to shift the phase of the signal (step 206). The above overlap deviation correction is shown in FIG. 18 in a block diagram form.

With respect to paper sheet surface, when hue values are measured on the sheet at a plurality of points and are not the same, the zig-zag running or fluctuations of the belt are considered as its cause. When a hue change exceeds its allowable range, the fact is displayed on the display screen of the panel or host computer to prompt the user to do a service call. When the hue change is within the allowable range, an overlap deviation is found as an average of the hue values at the plurality of point.

In accordance with the present embodiment, overlap deviations are detected by printing a vertical/horizontal stripe pattern and can be reduced by controlling the laser irradiation position. Thus, the reference color reproduction can be realized.

Figure 19:
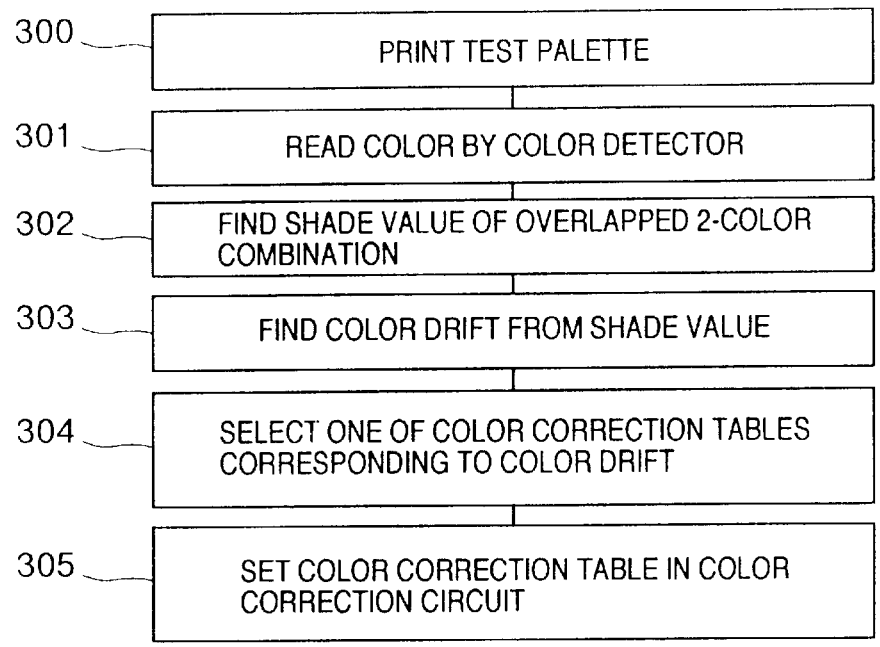
FIG. 19 shows a procedure for setting the overlap deviation in a color correction table for correction.
Figure 20:
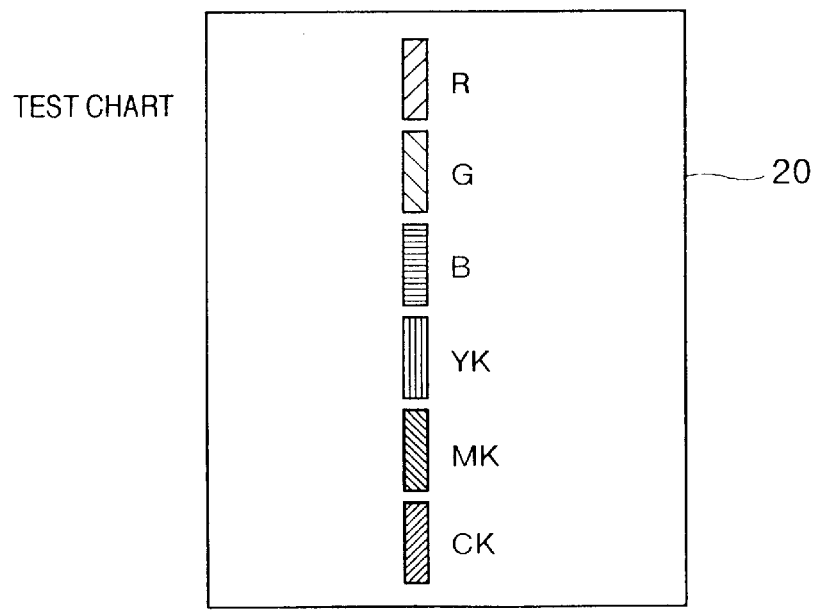
FIG. 20 shows a test chart for color correction in another embodiment of the present invention.

As another embodiment, a grid pattern or a dot pattern arranged in a grid form is prepared as a test chart having remarkable hue changes caused by overlap deviations, so that 2-color overlap deviation is estimated based on a change in 2-color hue, and a corresponding color correction table is set for color correction. The procedure is shown in FIG. 19. In a step 300, first of all, the CPU instructs printing of such a test chart as shown in FIG. 20. This test chart corresponds to a dot pattern of 2-color combinations YM, YC, MC, YK, MK and CK. The test chart is printed through the above print instruction and read by the color detector 28 (step 301). The hue H is found based on the read R, G and B data (step 302). An overlap deviation is found on the basis of the found hue value deviated from the reference hue value. In this case, it is unnecessary to know the overlap deviation is deviated in which direction and to which extent.

Color correction tables are previously prepared for overlap deviations and one of such tables is selected based on the overlap deviation found in the above (step 304). The selected table is set in a color correction circuit 55 (step 305). Then input data is subjected to a color correction at the color correction circuit 55.

A mapping color correction table is previous prepared on the basis of the half tone processing method, the 4-color separation conditions and an overlap deviation estimate from the color detector.

Explanation will be made as to how to find the color correction table with use of FIG. 22. First of all, target values to be reproduced for YMC input values of representative 729 points are found at a block 59. In this case, the target values are assumed to have L*a*b* values in L*a*b* color coordinates at a block 60. Meanwhile, a color reproduction model indicative of the half tone processing method, 4-color separation conditions and overlap deviation is previously set at a block 61, and Y, M and C combinations are adjusted at a block 62 to find Y, M and C combinations having minimum differences from the target values. These are called color correction values (block 63). That is, color correction values are found for the 729 points and then a table is prepared. Assuming that overlap deviation ranges from 0 up to about 150 μm in increments of 10 μm, then 16 color correction tables for the overlap deviations are prepared. For overlap deviations larger than the above, it becomes necessary to control the laser irradiation position for positional alignment because blurring take place in line drawing.

As an exemplary color reproduction model usable in the above case, a color stimuli subtractive mixture model is shown. This model is used to print a half tone palette with use of the single colors Y, M, C and K, measure the spectral reflectance factor characteristics thereof, previously find from these spectral reflectance factor characteristics a ratio of absorption coefficient to scattering coefficient for each color gray scale with use of wavelength as parameter, simply add Y, M, C and K absorption/scattering coefficient ratios for the Y, M, C and K half tone data of the printed blended-color palette and an absorption/scattering coefficient ratio for white ground, find a absorption/scattering coefficient ratio of the blended color palette for each wavelength, and find from these absorption/scattering coefficient ratios a spectral reflectance factor for the blended color to thereby estimate its reproduced color.

A relationship between reflection factor R and absorption/scattering coefficient ratio k/s can be expressed by the following equation (2).

$$(k/s)_\lambda = (1-R_\lambda)^2/2R_\lambda \quad (2)$$

where k is absorption coefficient, s denotes scattering coefficient, and λ denotes wavelength. The absorption/scattering coefficient ratio for a blended color is expressed in terms of addition of absorption/scattering coefficient ratios for Y, M, C and K half tone data and a absorption/scattering coefficient ratio for white ground, as shown by the following equation (3).

$$(k/s)_{mix} = (k/s)_Y + (k/s)_M + (k/s)_C + (k/s)_K + (k/s)_W \quad (3)$$

where $(k/s)_Y$ denotes absorption/scattering coefficient ratio for Y gray scale and λ was omitted. When the blended-color absorption/scattering coefficient ratio is found, its reflection factor can be found in accordance with an equation (4) which follows.

$$R_\lambda = (k/s)_\lambda + 1 - \sqrt{(k/s)_\lambda^2 + 2(k/s)_\lambda} \quad (4)$$

Figure 23:
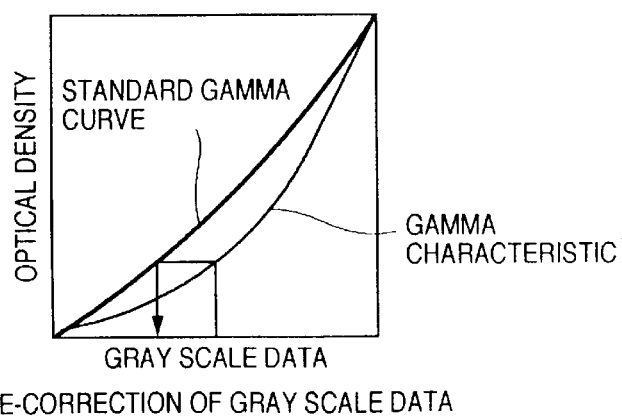
FIG. 23 is a graph for explaining overlap deviation-correction of half tone data when half tone processing or sheet was changed in the other embodiment of the present invention.

From the obtained reflection factor, 3 stimulus values X, Y and Z can be calculated. The color stimuli subtractive mixture model is a model when coloring materials are uniformly blended. However, when the color stimuli subtractive mixture model is modified, it can be applied to a color reproduction model for color laser beam printer (LBP). First, a color palette is printed with a reference paper sheet and a reference gamma characteristic based on reference half tone processing. When the printed result is too thick or too thin, adjustment is carried out by controlling its print energy or γ correction curve to obtain a predetermined γ characteristic curve. The predetermined γ characteristic curve is a monotonously increased curve with less saturation region. The γ characteristic curve varies depending on the paper sheet and half tone processing method. Different γ characteristic curves are taken for different qualities of paper sheet and different half tone processing methods and differences thereof from the γ characteristic curve based on the reference paper sheet and reference half tone processing method are previously stored in the form of function; or actually obtained γ characteristic curves are previously stored in a memory. When the half tone processing method or paper sheet in use is changed, input half tone data is re-corrected based on a difference from the reference gamma characteristic. Shown in FIG. 23 is how to re-correct input half tone data. The input half tone data is re-corrected to half tone data having the same density as the reference gamma characteristic, and the absorption/scattering coefficient ratio for the blended color is found using an absorption/scattering coefficient ratio based on the re-corrected half tone data.

The white color W as well as the Y, M, C and K single colors of the half tone palette are measured with respect to their spectral reflectance factor. A half tone palette of overlapped 2-color combinations is also measured with respect to their spectral reflectance factor. Using the equation (2), their absorption/scattering coefficient ratios are found. The found absorption/scattering coefficient ratios with respect to the half tone data are previously prepared in the form of a table. A model corresponding to the equation (3) inserted by a mutual interference term is expressed as follows.

$$(k/s)_{mix} = C_Y(k/s)_Y + C_M(k/s)_M + C_C(k/s)_C + C_K(k/s)_K + (k/s)_W + C_{YM}(k/s)_Y(k/s)_M + C_{MC}(k/s)_M(k/s)_C + C_{YC}(k/s)_Y(k/s)_C \quad (5)$$

where $C_Y$, $C_M$, $C_C$, $C_K$, $C_{YM}$, $C_{MC}$, and $C_{YC}$ are adaptive functions, and wavelength λ is omitted. The equation (5), for the purpose of setting a model capable of coping with the half tone processing method, overlap deviation or the like, contains adaptive coefficients of first and second orders or an adaptive function. The adaptive function includes a series of coefficients optimized for the respective gray scales.

These coefficients are determined so that an error between the absorption/scattering coefficient ratio of the overlapped 2-color combinations and an absorption/scattering coefficient ratio found from the above model becomes minimum. In this connection, logarithms may be found for measured and calculated values and then a difference therebetween may be controlled to become minimum. Further, function other than logarithm may be employed.

Some overlap deviations are previously generated for some half tone processing methods, for which adaptive coefficients are previously found. Any color reproduction model capable of coping with color drift other than the above equation (5) can also be set.

When the white ground is changed, spectral reflectance factors of some colored paper sheets are first previously measured, the paper sheets are previously read by the color detector 28 to find R, G and B values, and these values are previously prepared in the form of a table. And the absorption/scattering coefficient ratio of one of the sheets closest in color is set based on the R, G and B values.

When an accurate color reproduction model is found in such a manner as mentioned above, a combination of the colors Y, M, C and K is determined to produce the target color. When a color correction table for the 729 representative points is prepared and set in the color correction circuit 55, optimum color correction can be realized.

That is, the previously-measured hue values of white grounds of a plurality of qualities of paper sheets are previously associated with white ground data for use of color correction, so that one of the hue data closest to the read data of white ground of a paper sheet used in the apparatus is selected, a color correction matrix or a color correction table calculated using the selected hue data is used or one of the color correction tables previously prepared for a plurality of overlap deviations for color correction.

A gamma correction curve and a color correction table as defaults are previously set at the time of factory shipping to provide optimum color reproduction. That is, a test chart is printed by the color image generating apparatus adjusted, a gamma characteristic and a color characteristic are measured by a standard measuring device, and a gamma correction curve and a color correction table are set so as to provide a set gamma characteristic and color reproduction. These curve and table are set with respect to each of paper sheets including OHP sheet and half tone processing methods. Further, the above test chart is read by the color detector 28 included in the color image generating apparatus, and the color detector 28 is calibrated based on the read data and the values measured by the standard measuring device. And the calibrated data is stored in the ROM. The calibrated data is prepared for each of the paper sheets and OHP sheet.

When the user changes the black ink addition and under-color removal quantity, one of the color correction tables corresponding to it is selected. Some picture requires more black ink addition. When the black ink addition is increased, this causes change of the color, thus requiring color correction.

Since a color to be printed by combinations of the colors Y, M, C and K can be estimated based on the aforementioned color reproduction model, a color correction table for production of the target color can be prepared.

In accordance with the present embodiment, when a grid pattern or a dot pattern is printed for color measurement, overlap deviation can be estimated and a color correction table corresponding to it can be set for color correction, whereby accurate color correction can be realized. Further, even when the black ink addition and under-color removal quantity are arbitrarily changed, an optimum color correction table can be prepared with use of the color reproduction model, thus enabling printing with a high color reproducibility.

Figure 24:
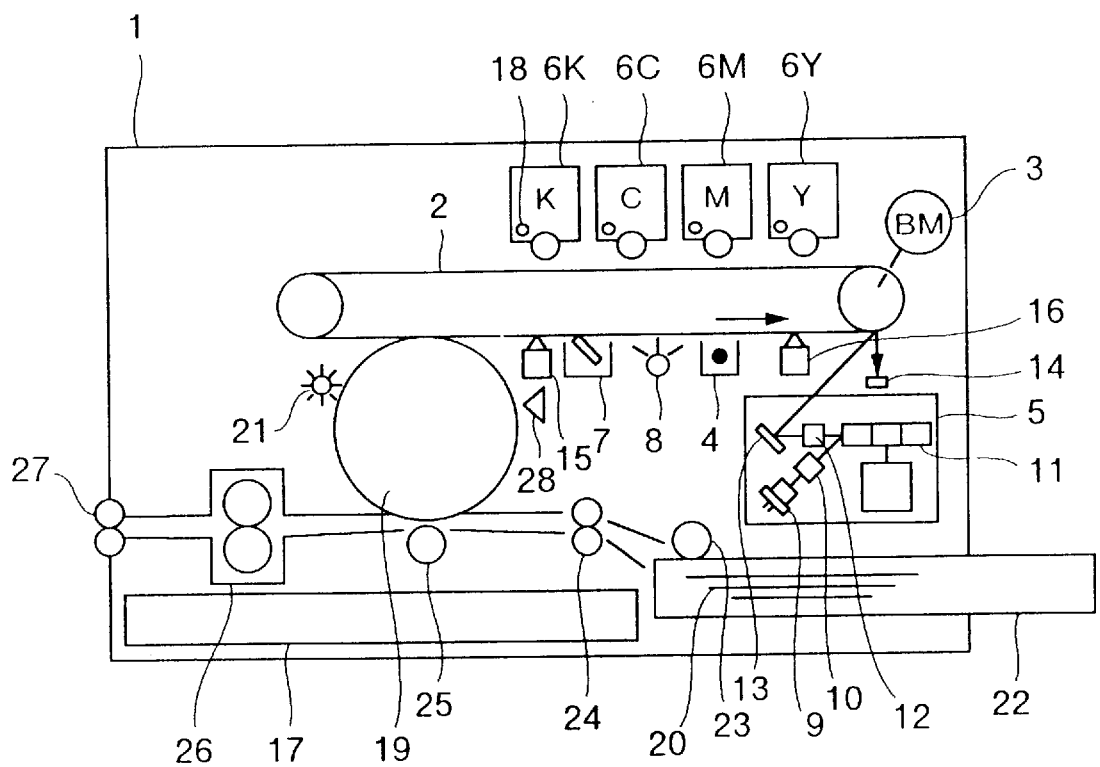
FIG. 24 schematically shows a color image generating apparatus in accordance with another embodiment of the present invention.
Figure 25:
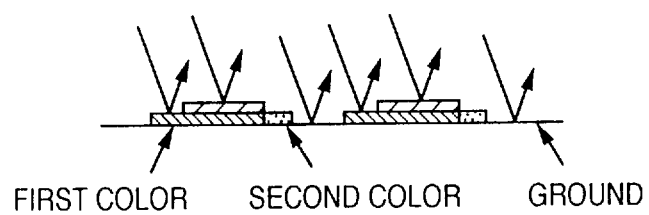
FIG. 25 shows a state in which toners are overlapped on an intermediate transfer drum in the other embodiment of the present invention.

Explanation will next be made as to another embodiment in which a color detector is provided close to the surface of an intermediate transfer drum to measure overlap deviation on the intermediate transfer drum. FIG. 24 shows an arrangement of an color image generating apparatus in accordance with the present embodiment of the present invention. The color detector 28 issues light to the intermediate transfer drum 19 and receives light reflected thereby. FIG. 25 shows how toners are overlapped. On the intermediate transfer drum 19, toner particles adhere as layered and thus the irradiation light from the color detector 28 is scattered on the drum. When the second color toner fully covers the first color toner, the color detector fails to receive a majority of the light reflected by the first color toner. Accordingly, a color is generated by a light combination of the light reflected by the underlying exposed toner and covering toner and the ground color of the intermediate transfer drum. The ground color of the intermediate transfer drum is usually colored in red brown. The calibration of the color detector is carried out based on the ground color of the intermediate transfer drum without any toners carried thereon. When the ground color is unstable, the calibration is effected under a condition that the intermediate transfer drum is fully covered thereon uniformly with the solid toner. Accordingly, in the case of 2-color overlap deviation, other than the 2 colors is previously recorded as the ground color, and a test chart in a stripe form or dot pattern is recorded on other than the 2 colors to detect overlap deviation quantity color drift quantity. Overlap deviation correction and color correction are substantially the same as those in the foregoing embodiment.

In accordance with the present embodiment, the color correction can be carried out without outputting any printed sample outside the color image generating apparatus.

Figure 26:
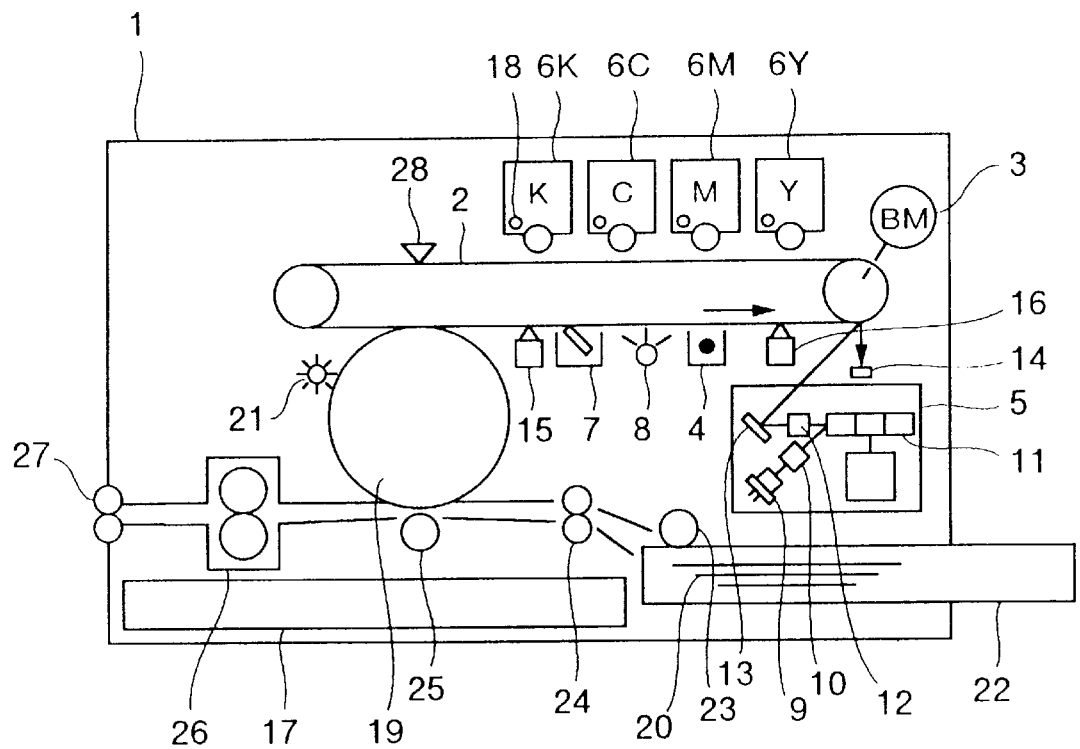
FIG. 26 schematically shows a color image generating apparatus in accordance with a further embodiment of the present invention.

Explanation will then be made as to a further embodiment in which a color detector 28 is provided close to the surface of a photosensitive belt 2 to measure overlap deviation on the photosensitive belt. An arrangement of a color image generating apparatus in accordance with the present embodiment is shown in FIG. 26. The first color is developed so that the toner image of the first color adheres onto the photosensitive belt and then the second color is developed so that the toner image of the second color adheres on the photosensitive belt as overlapped with the first toner image, with the first color toner image not being transferred onto the intermediate transfer drum 19. When the potential of the intermediate transfer drum 19 is the same as that of the photosensitive belt 2, toner transfer will not take place. The blade of the cleaner 7 is kept in its raised state. In this connection, the toners are kept at such a potential as not released through re-exposure.

The color detector 28 issues light to the photosensitive belt 2 and receives light reflected thereby. On the photosensitive belt, toner particles adhere as layered. The light issued from the color detector 28 is scattered on the photosensitive belt as in the intermediate transfer drum 19. A detected color is generated by a light combination of the light reflected by the underlying exposed toner and covering toner and the ground color of the photosensitive belt 2. The ground color of the photosensitive belt 2 is usually colored in green or so on. The calibration of the color detector is carried out based on the ground color of the photosensitive belt without any toners carried thereon. When the ground color is unstable, the calibration is effected under a condition that the photosensitive belt is fully carried thereon uniformly with the solid toner. Accordingly, in the case of 2-color overlap deviation, one of the 2 colors is previously recorded as the ground color, and a test chart in a stripe form or dot pattern is previously recorded on one color to detect overlap deviation quantity color drift quantity. Overlap deviation correction and color correction are substantially the same as those in the foregoing embodiment.

In accordance with the present embodiment, the color correction can be carried out without any need for externally outputting any samples.

As other embodiment, such an arrangement may be possible that, after the laser irradiation position is controlled to correct a positional overlap deviation, a test chart is again recorded to detect its hue value, and one of the color correction tables corresponding to the detected hue value is selected and set in the color correction circuit 55 for color correction. When the color detector 28 is installed close to the surface of the intermediate transfer drum 19 or photosensitive belt 2, the color correction can be realized through two recording operations without the need for outputting any printed sample outside the color image generating apparatus.

It is also possible to correct overlap deviation in the former half of one recording operation and to measure in the latter half thereof the hue value of a test chart with the corrected overlap deviation to one of the color correction tables.

In accordance with the present embodiment, accurate color reproduction can be implemented.

Figure 27:
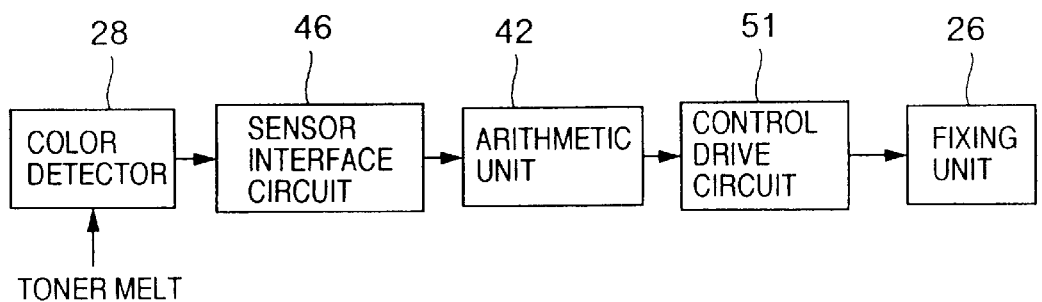
FIG. 27 is a block diagram of an arrangement of the embodiment of the present invention for controlling fixing temperature based on color value measured by a color detector.
Figure 28:
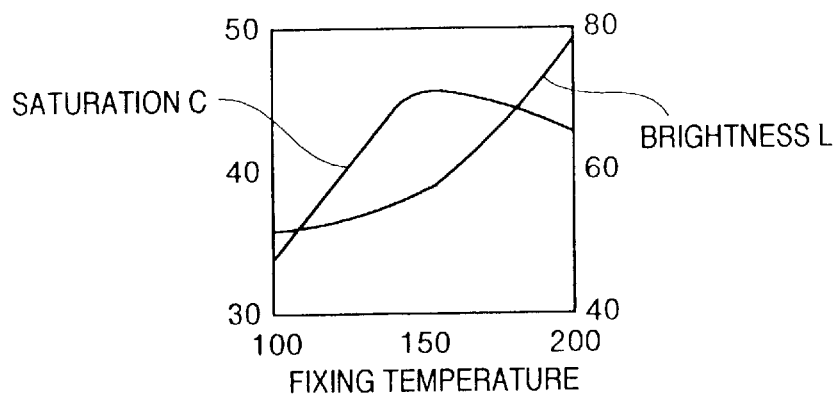
FIG. 28 shows variations in saturation and lightness with respect to the fixing temperature of a fixing unit in accordance with the other embodiment of the present invention.

Explanation will next be made as to, as an example, how to control the fixing temperature of the fixing unit 26 used in to each of the foregoing embodiments. In this case, as shown in FIG. 27, saturation and lightness values are found from R, G and B data of the color detector 28 and the fixing temperature of the fixing unit 26 is controlled on the basis of the saturation and lightness values. As shown in FIG. 28, the melting degree of the toner varies depending on the fixing temperature and thus the saturation and lightness also vary. As the fixing temperature is increased, the toner gradually melts, thus increasing the saturation and lightness values. When the fixing temperature extremely rises, the toner tends to be released from the paper sheet or OHP sheet, so that the saturation drops and the lightness further rises. Accordingly, the saturation and lightness values at the optimum fixing temperature are used as references so that, when the saturation and lightness values found from the R, G and B data obtained by the color detector 28 are deviated from their references, the deviations are used to control the fixing temperature.

In accordance with the present embodiment, OHP sheets having high light transmission factor can be printed always with the optimum fixing temperature.

Although the above explanation has been made as to the color laser beam printer using the photosensitive belt, the present invention may be also applied to other examples using a photosensitive drum, which will be shown below.

Figure 29:
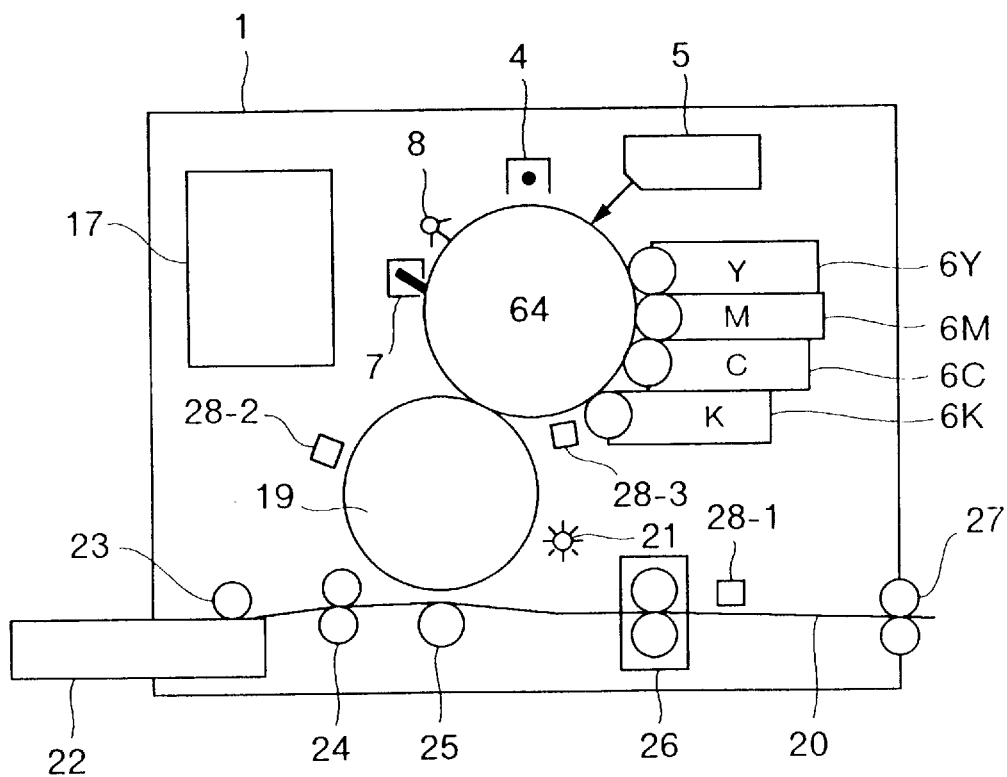
FIG. 29 schematically shows a color image generating apparatus in accordance with yet another embodiment of the present invention.

Referring to FIG. 29, there is shown a 2-drum type color laser printer which has a photosensitive drum 64 and an intermediate transfer drum 19. A color detector 28-1, 28-2 or 28-3, as in the foregoing example, is installed downstream of a fixing unit 26 or close to the surface of the intermediate transfer drum 19 or photosensitive drum 64.

Figure 30:
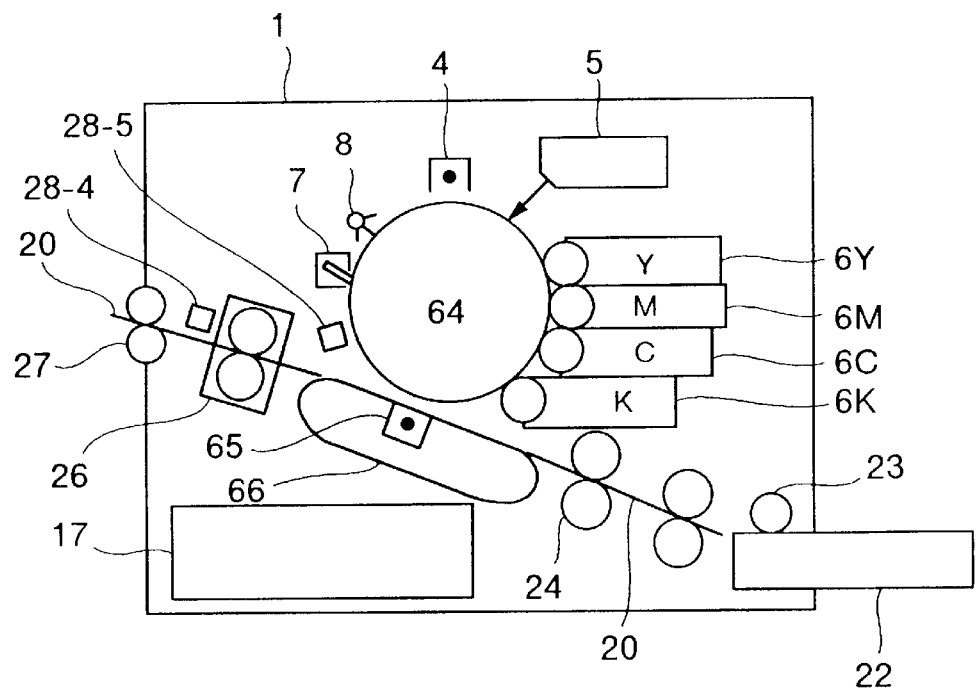
FIG. 30 schematically shows a color image generating apparatus in accordance with yet a further embodiment of the present invention.

Shown in FIG. 30 is a color laser printer of a type in which 4 colors are overlapped on the photosensitive drum 64 so that a color toner image is transferred by a transfer unit 65 onto a paper sheet 20 fed by a feed belt 66. Overlap deviation results from a change in the rotation of the drum caused by the loads of the respective developing units 6. A color detector 28-4 or 28-5 is installed downstream of the fixing unit 26 or close to the surface of the photosensitive drum 64.

In the printers of the photosensitive drum type shown in FIGS. 29 and 30, since substantially no overlap deviation takes place in the main-scan direction, overlap deviation in the feed direction will be corrected. Its correcting method is carried out by the foregoing method. In accordance with the present embodiment, color drift caused by the overlap deviation of the photosensitive rum type color image generating apparatus can be corrected.

Figure 31:
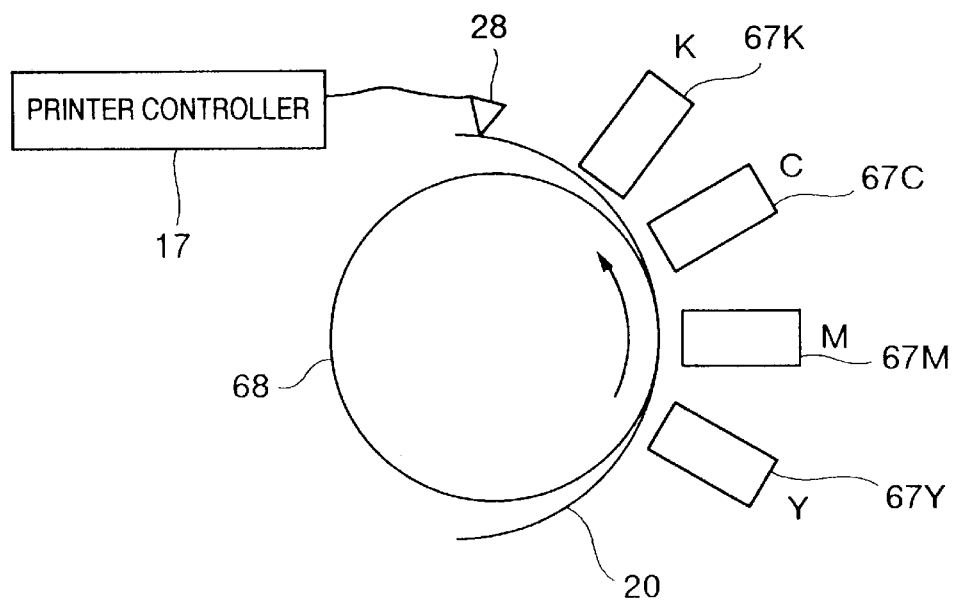
FIG. 31 schematically shows a structure of a printing part of a color ink jet printer using a plurality of line heads for use in the other embodiment of the present invention.
Figure 32:
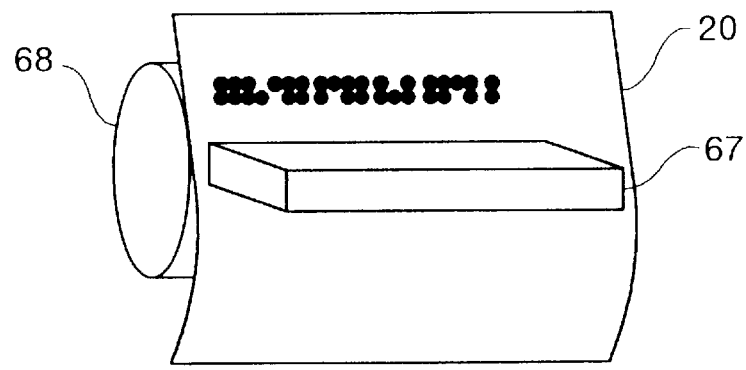
FIG. 32 is a schematic perspective view of the printing part of FIG. 31.

There is shown another embodiment in which the resent invention is applied to an ink jet printer having line heads. Shown in FIG. 31 is a printing part of the ink jet printer having 4 line heads 67Y, 67M, 67C and 67K for colors Y, M, C and K. FIG. 32 shows, in a perspective view, only one of the line heads 67 in FIG. 31, illustrating a state printed on the paper sheet 20. The paper sheet 20 is recorded and fed by the color line heads 67 and a feed roller 68 in the order of the colors Y, M, C and K. The color detector 28 is installed at an output stage of the printer. The printer controller 17 corrects the overlap deviation on the basis of information received from the color detector 28. When 3 or 4 line heads are arranged, its installation error causes overlap deviation. To avoid this, a stripe pattern is printed to detect a horizontal overlap deviation. And the record start timing is changed correspondingly. In the case of the drum type printer, the printer can have such a structure as to be pushed only to one side, so that there is no displacement in the main-scan direction and thus only it is enough to correct a displacement in the feed direction. In order to correct fluctuations in the overlap deviation of manufactured printers mainly at the time of factory shipping, the overlap deviation is measured to determine the record start timing.

In accordance with the present embodiment, correction can be realized over the color drift caused by the overlap deviation of the ink jet printer having the line heads.

Figure 33:
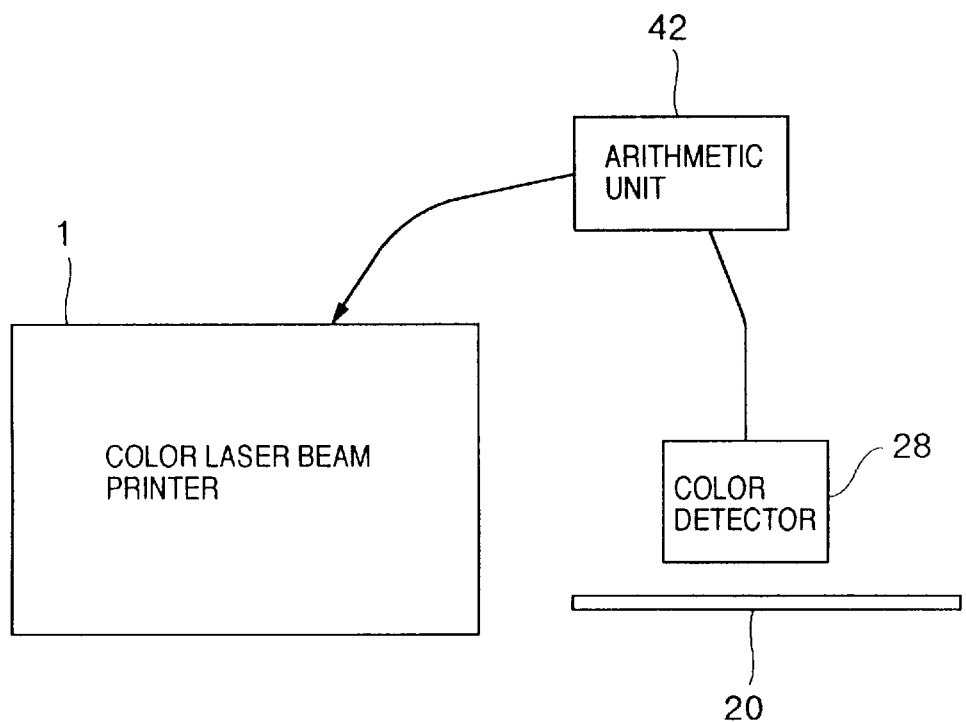
FIG. 33 is a diagram for explaining how to correct overlap deviation color drift in an inspection line in the other embodiment of the present invention.

There is shown in FIG. 33 another embodiment in which overlap deviation and color drift are corrected at the time of its factory shipping. A stripe test chart is printed by a color image generating apparatus and the color is measured by a color detector 28 equipped with an inspection line. The measured value of the color detector 28 is sent to the arithmetic unit 42 where its hue value is found and an overlap deviation is estimated from the measured value, and the record start timing is adjusted. Even so, since different sheets have different color characteristics, a test chart is printed to measure a color drift and to set a color correction table and a gamma correction table. A plurality of such gamma correction tables are prepared for different qualities of paper sheets and different half tone processing methods, and a plurality of such color correction tables are prepared for different 4-color separation conditions. Further, saturation and lightness values are found from the measured color value to adjust the fixing temperature.

In accordance with the present embodiment, optimum color reproduction can be ensured at the time of factory shipping.

Explanation will next be made as to color correction in a non-continuous print mode.

The photosensitive belt 2 and intermediate transfer drum 19 cannot be driven always accurately parallelly. In particular, the eccentricity of the intermediate transfer drum 19 causes a force to be applied to the photosensitive belt 2, with the result that the photosensitive belt 2 positionally varies in its main-scan direction. When the photosensitive belt 2, after stopped for a while, is run, since there is no toner between the photosensitive belt 2 and intermediate transfer drum 19, no slip takes place therebetween and a force is applied to the photosensitive belt 2 in the main-scan direction.

Figure 34:
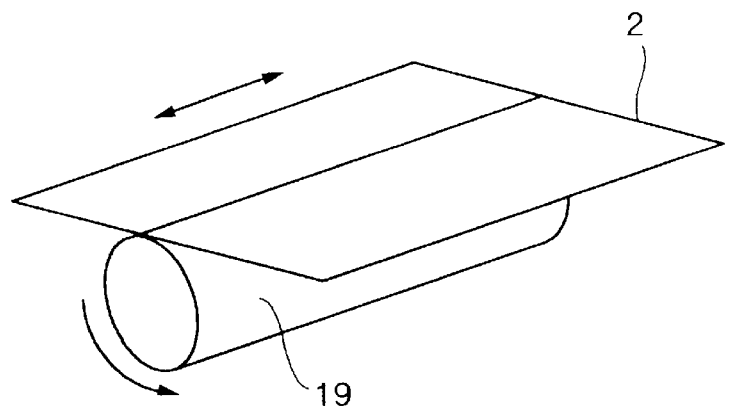
FIG. 34 is a diagram for explaining a displacement in belt position caused by friction between a photosensitive belt and an intermediate transfer medium.

This manner is shown in FIG. 34. When the first color Y is started to record, the toner is trapped between the photosensitive belt 2 and intermediate transfer drum 19, so that the force in the main-scan direction becomes small.

Figure 35:
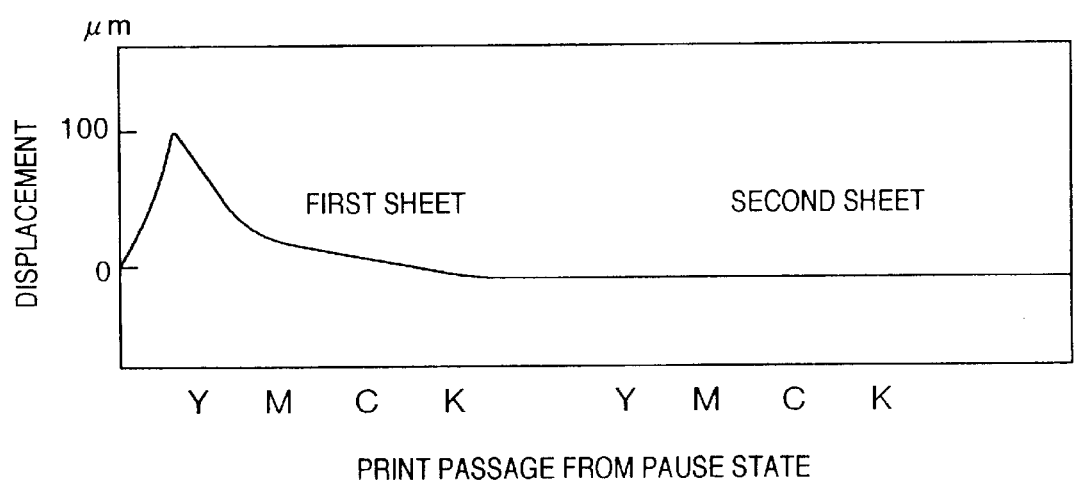
FIG. 35 shows a variation in the positional displacement of the photosensitive belt at the time of starting the printing operation.

FIG. 35 shows a relationship between the positional displacements of the photosensitive belt for the first sheet (in non-continuous print mode) and for the second and subsequent sheets (in a continuous print mode). As shown in the drawing, color drift takes place between the color Y and the other colors only for the first sheet, while overlap deviation becomes stable for the second and subsequent sheets.

Figure 36:
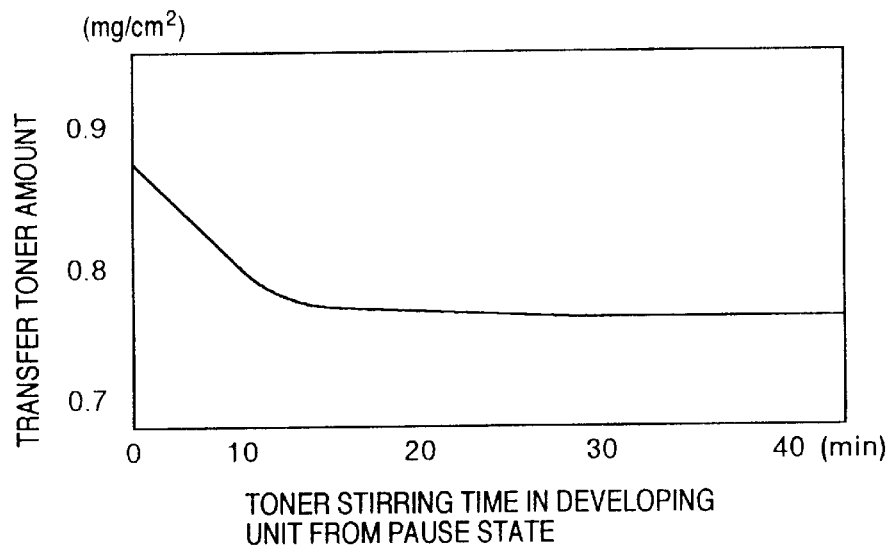
FIG. 36 shows a variation in the amount of transfer toner at the time of starting the printing operation.

Shown in FIG. 36 is a graph showing a variation in the transfer toner amount at the time of starting printing operation. Though the toner of the developing unit 6 is stirred so as to have a constant toner density in the continuous print mode; when the printing operation is again started after the printer is stopped for a while, the printed image becomes thick because the transfer toner amount is increased. This is because a potential difference from the photosensitive belt 2 causes more toners to be applied onto the photosensitive belt 2, since the toner charge quantity in the developing unit 6 is insufficient. As the toner stirring of the developing unit 6 is sufficiently carried out, the toner charge quantity becomes constant. In this case, a time constant is about between 10 and 15 minutes. FIG. 36 is a curve showing how the transfer toner quantity to the photosensitive belt 2 varies with respect to a toner stirring time from a print pause condition. Since the density of an image transferred onto the paper sheet 20 varies according to the illustrated curve, the variation is detected by the color detector 28 and corrected by the color drift correcting means.

Figure 37:
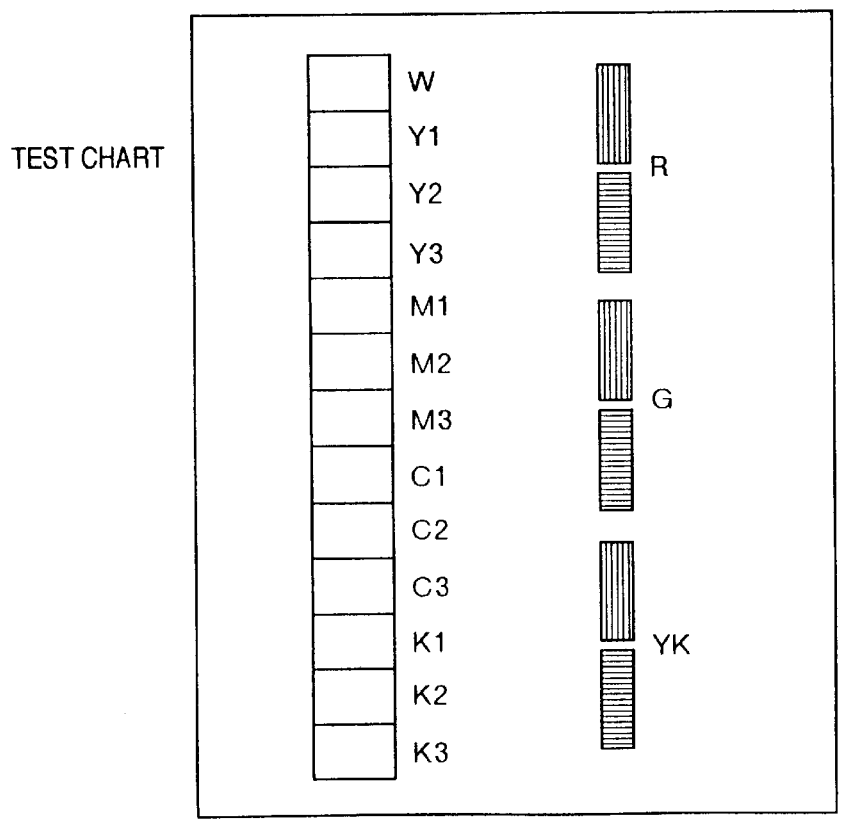
FIG. 37 shows a test chart for checking density change and overlap deviation.

Shown in FIG. 37 is a test chart for knowing a color drift tendency. In the present embodiment, the color detector 28 comprises 2 spot color sensors which grasp density, saturation and overlap deviation variation tendencies. More specifically, on the test chart printed on the paper sheet 20, a palette of the colors Y, M, C and K are arranged in a strip form at one side of the sheet while 3 or more of the 2-color combinations YM, YC, MC, YK, MK and CK are selected and arranged in vertical/horizontal stripes at the other side of the sheet to know a relative overlap deviation of the 4 colors Y, M, C and K. When the color detector 28 comprises a single spot color sensor, the above palette and 2-color stripes are arranged in serial. How to handle these stripes is the same as in the embodiment of FIGS. 15 and 16.

Figure 38:
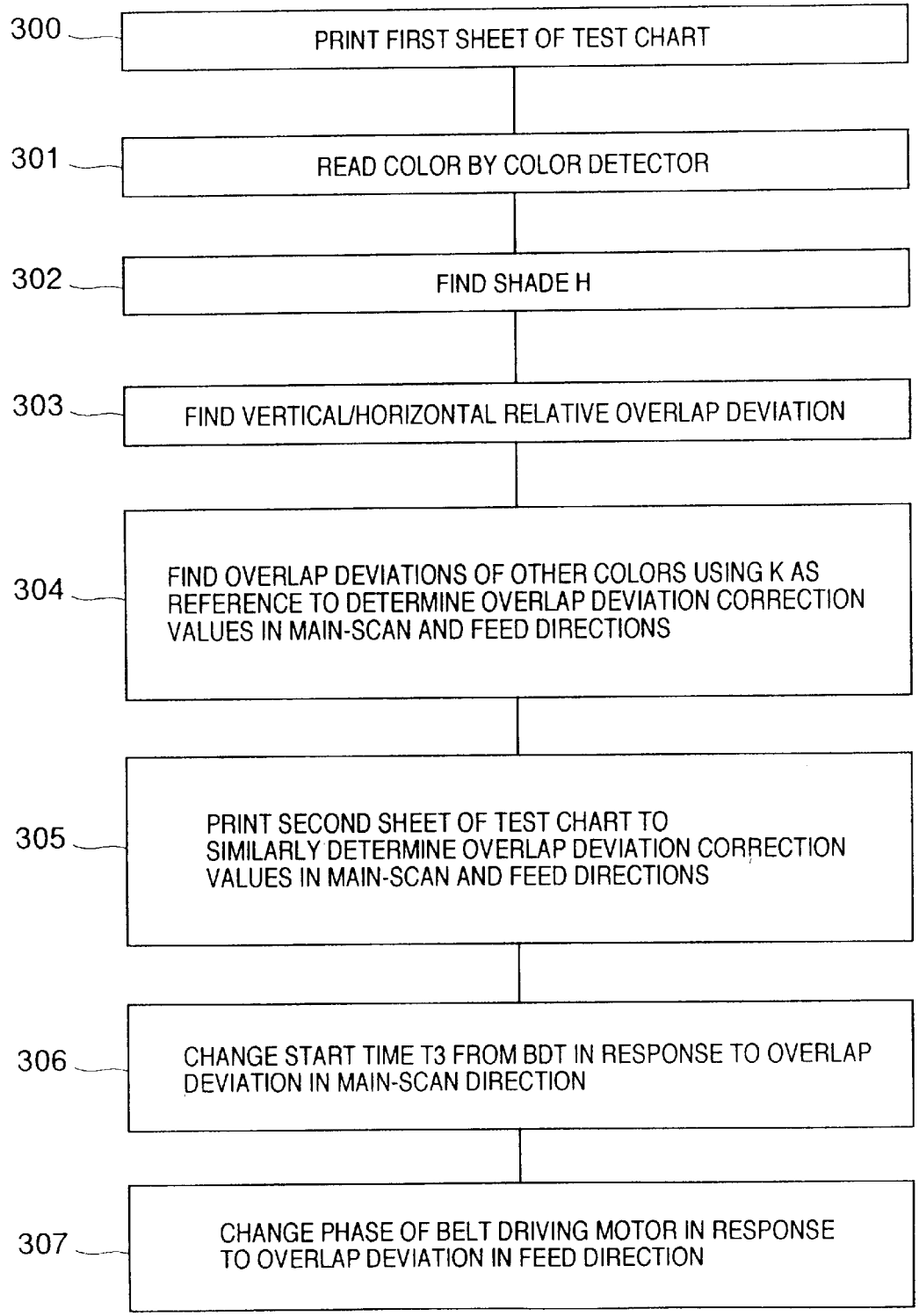
FIG. 38 shows a flowchart for overlap deviation correction.

Referring to FIG. 38, there is shown a procedure for correcting the overlap deviation. After the color laser beam printer is started or after it is paused for a while, the above test chart is first printed in the continuous print mode. Since the first printed test chart tends, in many cases, to be different in color drift tendency from the second and subsequent test charts, the continuous 2-sheet printing is carried out in this case.

In a step 300, first, the first test chart is printed. In a step 301, the color of the 2-color overlap deviation stripes is measured by the color detector 28. In a step 302, the hue H is found from the R, G and B data read out by the color detector 28. A relative vertical/horizontal overlap deviation is found from FIG. 17 on the basis of the found hue value deviated from its reference hue value and is used as a correction value (step 303).

A reference color (K in this example) is determined, overlap deviations with respect to the other colors are found and set as correction values (step 304). In a step 305, overlap deviations are found and determined as overlap deviation correction values similarly to the second test chart.

In this conjunction, the color detector 28 may be replaced by such a sensor that can detect displacements in the main-scan and feed directions to detect overlap deviations and determine them as correction values.

The displacement in the main-scan direction, according to the correction values of the first and second test charts, is corrected by controlling the start time T3 from the main-scan synchronization reference signal BDT. Alternatively, it is corrected by shifting the phase of the main-scan synchronization reference signal BDT (step 306). The displacement in the feed direction is corrected by controlling the print start time T1 from the feed-directional reference position signal TPS or by controlling the belt driving motor 3 to shift the phase thereof (step 307).

For the third and subsequent test charts, the correction is carried out similarly to the second test chart. When the overlap deviations are different in the second and third test charts in the continuous print mode, continuous 3 test charts are printed and the same correction as the above is carried out.

In accordance with the present embodiment, since the density and overlap deviation corrections are carried out according to the density and overlap deviation variation tendencies in the continuous and non-continuous print modes, color drift at the time of starting the printer can be suppressed and stable color reproduction can be realized.

As another color drift correcting method, there is such a method that a grid pattern having remarkable hue changes caused by overlap deviations or a pattern of dots arranged in a grid form is prepared so that 2-color overlap deviations are estimated based on observed 2-color hue changes and color correction tables are correspondingly set for color correction.

Figure 21:
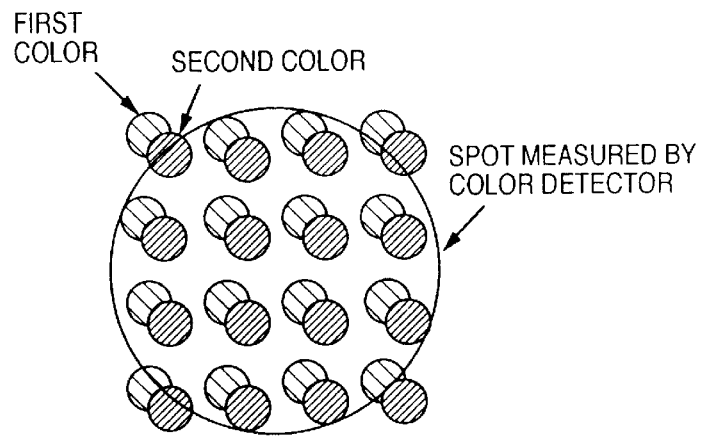
FIG. 21 is an enlarged diagram of the test chart of FIG. 20 showing a principle of detecting relative overlap deviation.

How to handel the dot pattern is carried out similarly to FIGS. 21 and 19.

Figure 39:
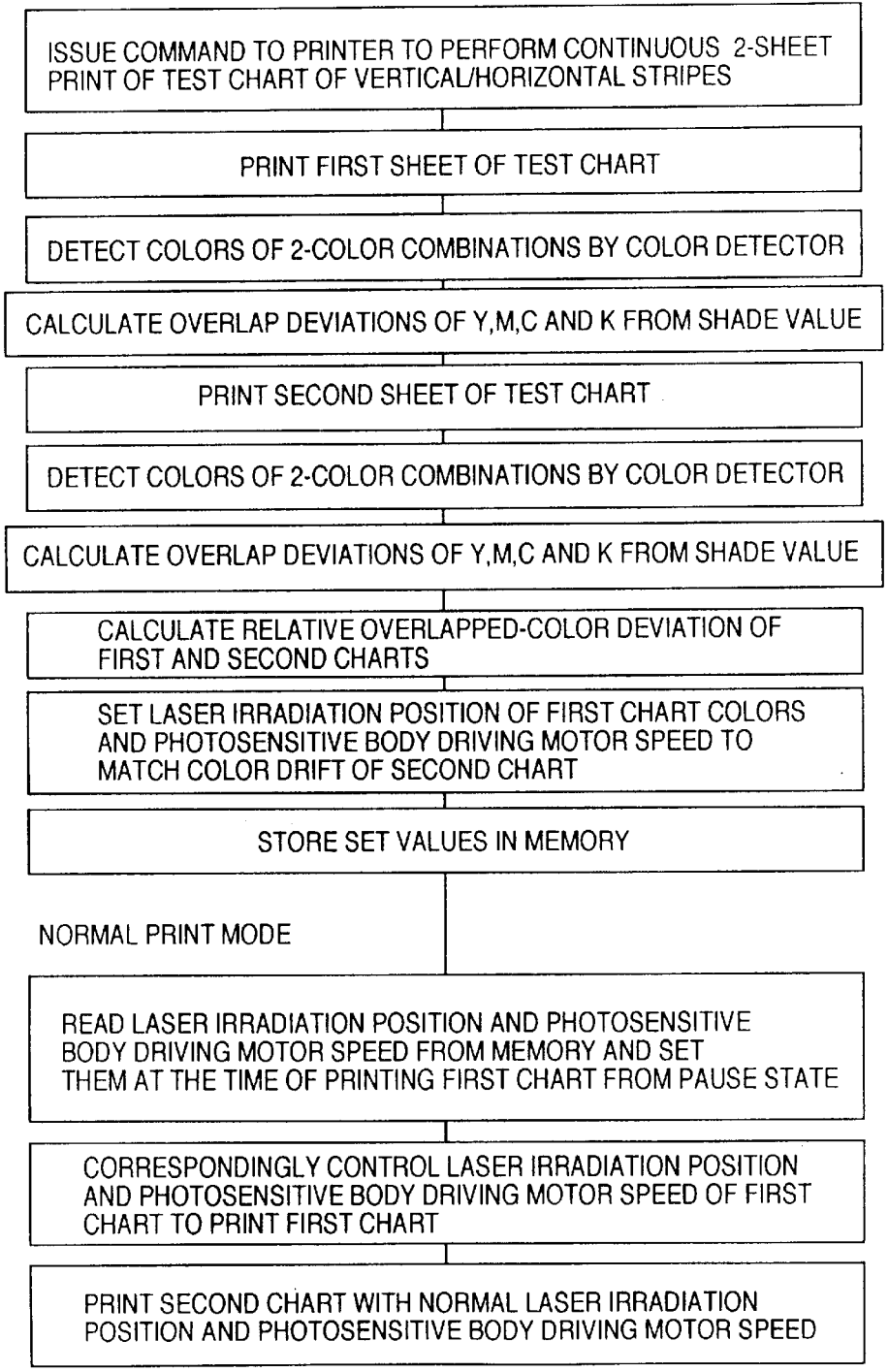
FIG. 39 is a flowchart showing an example of a color drift correction data creation mode.

Shown in FIGS. 39 and 40 are examples of the color drift correction data creation modes. The examples are designed so that a color overlap deviation in the first test chart and a color overlap deviation in the second test chart are detected by the color detector, and laser irradiation positions for the respective colors in the first test chart and the speed of the photosensitive belt driving motor are controlled so that the color overlap deviation in the first test chart becomes the same as that in the second test chart. Or the examples are designed so as to select one of color correction tables corresponding to the color overlap deviation.

Yet another embodiment of the present invention will be explained by referring to FIGS. 41 and 42. In the present embodiment, the color detector 28 is provided close to the surface of the intermediate transfer drum 19, two test charts are continuously recorded onto the intermediate transfer drum 19, and overlap deviation tendencies and density variation tendencies of the first and second test charts are measured. The present embodiment is different from the embodiment of FIG. 1 in that the color detector 28 is provided close to the surface of the intermediate transfer drum 19, and is designed so that the paper sheet 20 having a toner image fixed thereonto by the fixing unit 26 is discharged by the paper discharging roller 27 as it is.

Figure 41:
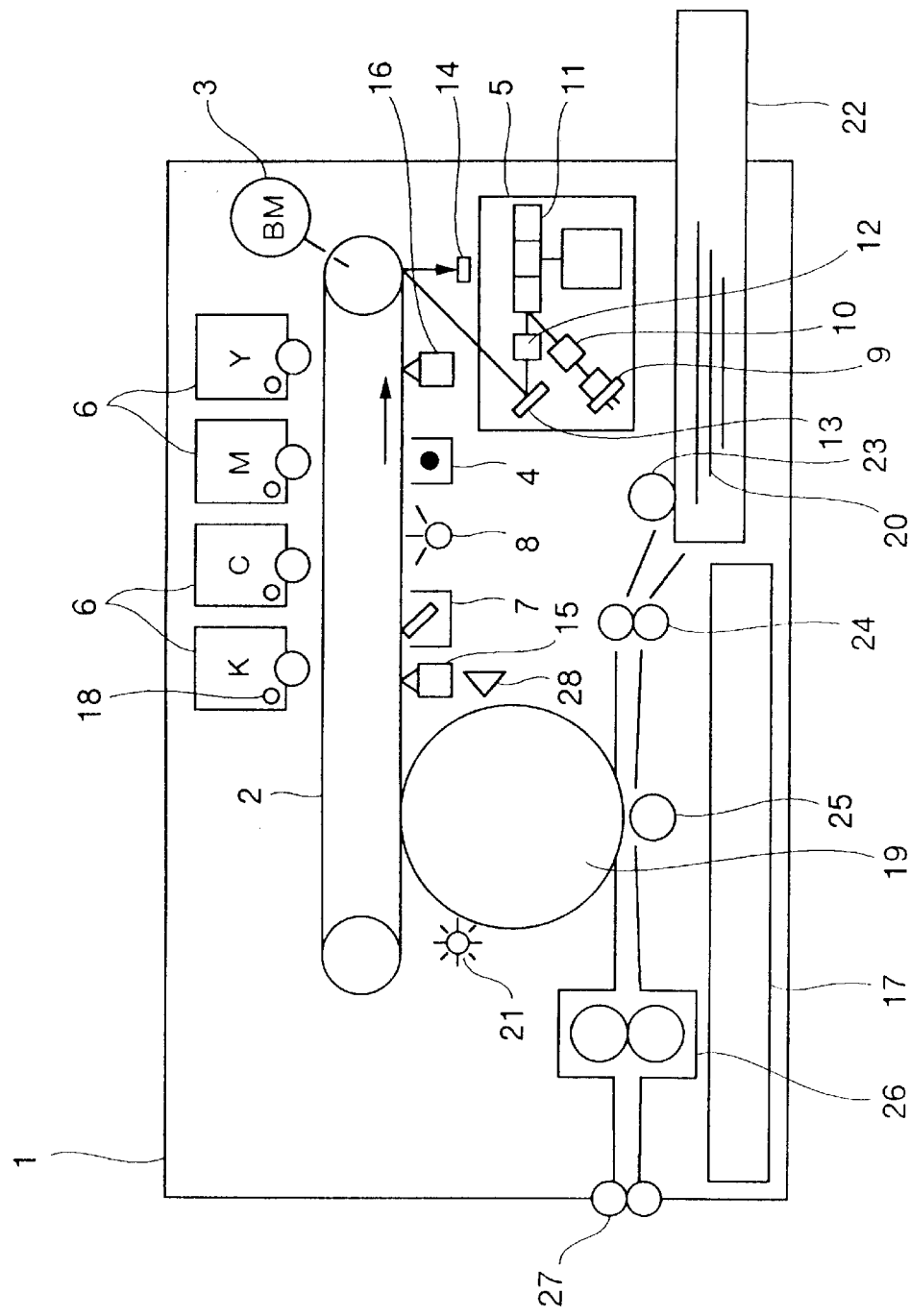
FIG. 41 is an arrangement of an embodiment in which the color detector is provided on the intermediate transfer drum.
Figure 42:
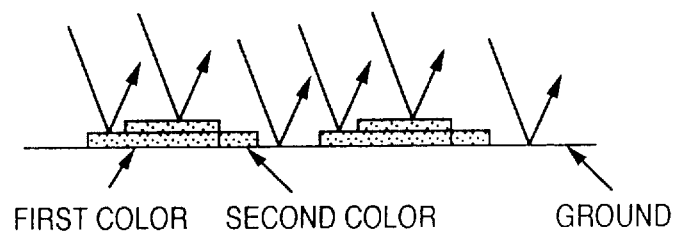
FIG. 42 shows a state in which toners are overlapped on the intermediate transfer drum.
Figure 43:
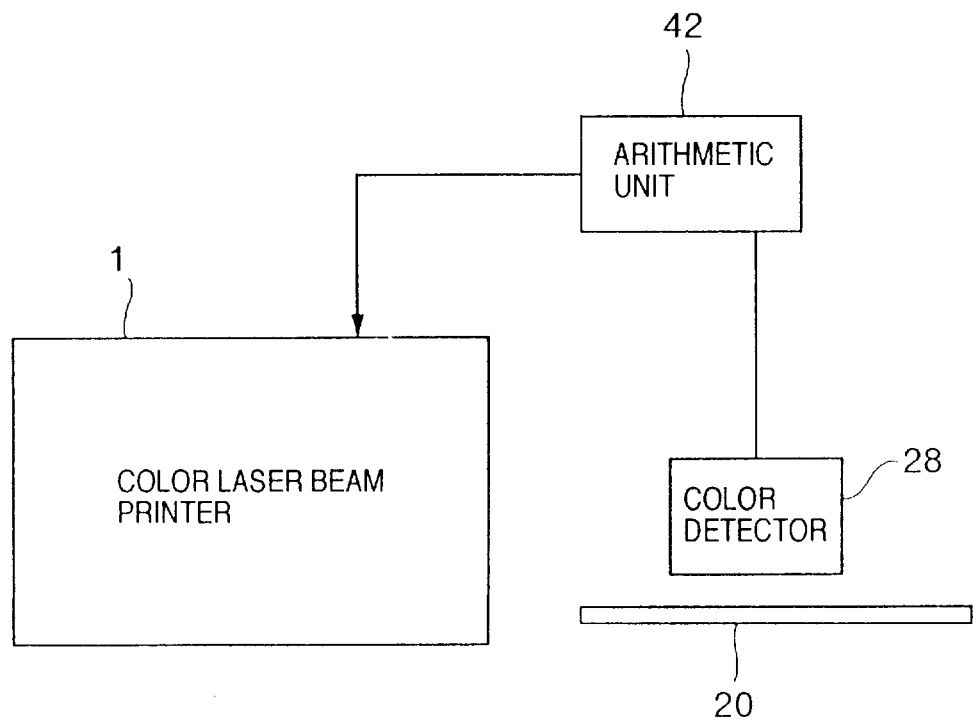
FIG. 43 shows an arrangement of an embodiment in which color measurement is carried out by the color detector to correct color drift in the inspection line.

The arrangement of the present embodiment is shown in FIG. 41, in which the color detector 28 issues light to the intermediate transfer drum 19 and receives light reflected thereby. FIG. 42 shows how toners are overlapped, that is, toner particles adheres as layered onto the intermediate transfer drum 19 and thus the irradiation light issued from the color detector 28 is scattered on the surface of the intermediate transfer drum. When the second-color toner layer fully covers the first-color toner layer, the color detector fails to receive a majority of the light reflected by the first color toner layer. Accordingly, a blended color is generated by a light combination of the light reflected by the underlying exposed toner and covering toner and the ground color of the intermediate transfer drum 19.

The ground color of the intermediate transfer drum 19 is usually colored in red brown. The calibration of the color detector 28 is carried out based on the ground color of the intermediate transfer drum without any toners carried thereon. When the ground color is unstable, the calibration is effected under a condition that the intermediate transfer drum is fully covered thereon uniformly with the solid toner. Accordingly, in the case of 2-color overlap deviation, other than the 2 colors is previously recorded as the ground color, and a test chart having a palette of single colors and in a stripe form is recorded on other than the 2 colors to detect a density variation quantity or an overlap deviation quantity.

And based on the density variation tendency and overlap deviation tendency, correction values for the first, second and subsequent test charts are found. Correspondingly, color correction and overlap deviation correction are carried out so as to satisfy the tendencies of the first and second test charts.

In accordance with the present embodiment, such color correction as to conform to the density variation and overlap deviation tendencies can be carried out without any need for outputting any printed sample outside the printer, so that stable color reproduction can be realized.

In all the foregoing embodiments, the overlap deviation and density variation tendencies have been measured and known at the time of starting the color laser beam printer. In place of it, however, such variation tendencies may be learned from each measured result on a time series basis.

Figure 22:
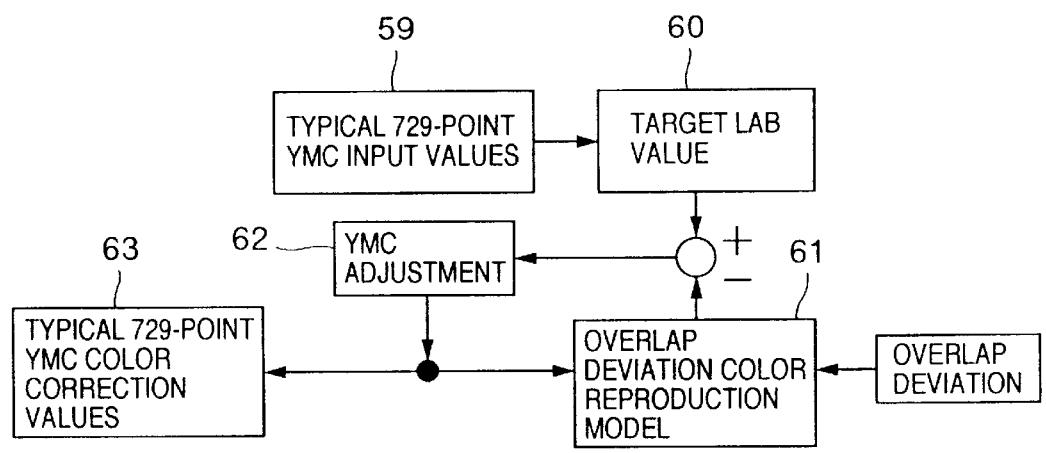
FIG. 22 is a diagram for explaining how to find the color correction table in the other embodiment of the present invention.

There is shown in FIG. 22 another embodiment of the present invention in which overlap deviation and color drift are corrected at the time of its factory shipping. Two test charts are printed by a color laser beam printer 1 and the color associated with an inspection line is measured by a color detector 28. The measured value of the color detector 28 is input to the arithmetic unit 42 where its hue value is found and an overlap deviation is estimated from the measured value, and the overlap deviation correction values of the first and second test charts are determined.

Further, a density variation is found from the color measured value and a density correction value is determined according to the found density variation. And the overlap deviation and density corrections are carried out at the time of starting the printer according to the correction value.

In accordance with the present invention, optimum color reproduction can be ensured at the time of factory shipping.

Although the above explanation has been made as to the embodiments relating to the color laser beam printer using the photosensitive belt, the present invention may be applied also to a printer using a photosensitive drum.

As has been explained in the foregoing, in accordance with the foregoing embodiments of the present invention, since density and overlap deviation corrections can be carried out according to density variation and overlap deviation tendencies, the color drift at the time of starting the printer can be suppressed and stable color reproduction can be established.

What is claimed is:

1. A color correcting method for a color image generating apparatus for overlapping materials of 3 or 4 colors to obtain a multicolor image, said method comprising steps of:

setting a predetermined relationship between a first test stripe of a first color and a second test stripe of a second color to be printed, said predetermined relationship providing a reference for determining color drift in said apparatus;

printing a test chart for determining whether color drift exists in said apparatus, said test chart including at least one 2-color combination of 2 of said 3 or 4 colors of the first test stripe of said first color and the second test stripe of said second color, determining a relationship between the first test stripe and the second test stripe in the at least one 2-color combination; and if the relationship between the first test stripe and the second test stripe in the at least one 2-color combination does not correspond to said predetermined relationship, controlling a record start position of said image generating apparatus in a main-scan direction and a record start position in a sub-scan direction to correct the relationship between the first test stripe and the second test stripe in the at least one 2-color combination to said predetermined relationship to thereby reduce color drift in said apparatus.

2. A color correcting method for a color image generating apparatus as set forth in claim 1, wherein said test chart includes at least two 2-color combinations of 2 of said 3 or 4 colors.

3. A color correcting method as set forth in claim 1, wherein said predetermined relationship corresponds to a predetermined overlapping relationship between the first test stripe and the second test stripe.

4. A color correcting method as set forth in claim 3, wherein the first test stripe and the second test stripe have a same width, and wherein said predetermined overlapping relationship is equal to the first test stripe overlapping the second test stripe by an amount corresponding to a percentage of said same width.

5. A color correcting method as set forth in claim 4, wherein said percentage is 50% of said same width.

6. A color correcting method as set forth in claim 1, wherein said predetermined relationship corresponds to a condition where said apparatus prints a color image without color drift, so that correction of the relationship between the first test stripe and the second test stripe to said predetermined relationship causes said apparatus to print a color image substantially free of color drift.

7. A color correcting method as set forth in claim 6, wherein said correction reduces color drift by correcting registration errors that exist when said apparatus overlaps said materials of 3 of 4 colors onto a photoreceptor surface.

8. A color correcting method as set forth in claim 1, wherein said printing, determining, and controlling steps are performed in response to a user-initiated request.

9. A color correcting method as set forth in claim 1, further comprising:

detecting the first test stripe and the second test stripe in said at least one 2-color combination using a color detector to derive a hue value; and determining the relationship between the first test stripe and the second test stripe based on the hue value.

10. A color correcting method as set forth in claim 9, wherein said color detector is a spot sensor.

11. A color correcting method as set forth in claim 1, wherein said 3 or 4 colors are yellow (Y), magenta (M), and cyan (C) or yellow (Y), magenta (M), cyan (C), and black (K), respectively.

12. A color correcting method as set forth in claim 1, wherein the first test stripe and the second test stripe are one of horizontal stripes and vertical stripes.

13. A color correcting method as set forth in claim 1, further comprising:

setting a predetermined relationship between a third test stripe of a third color and a fourth test stripe of a fourth color to be printed, said predetermined relationship between the third test stripe and the fourth test stripe providing a reference for determining color drift in said apparatus;

wherein said test chart includes at least one additional 2-color combination of 2 of said 3 or 4 colors of the third test stripe and the fourth test stripe, and wherein the following steps are performed:

determining a relationship between the third test stripe and the fourth test stripe in said at least one additional 2-color combination; and if the relationship between the third test stripe and the fourth test stripe in said at least one additional 2-color combination does not correspond to said predetermined relationship therebetween, controlling the record start position in said main-scan direction and the record start position in the sub-scan direction to correct the relationship between the third test stripe and the fourth test stripe to said predetermined relationship therebetween to thereby reduce color drift in said apparatus.

14. A color correcting method as set forth in claim 13, wherein at least one of said first color and said second color is same as at least one of said third color and said fourth color.

15. A color correcting method as set forth in claim 1, wherein said predetermined relationship corresponds to a degree to which the first test stripe deviates from the second test stripe, and wherein the first test stripe and the second test stripe are structured within said test chart so that a maximum deviation of the first test stripe from the second test stripe in said at least one 2-color combination does not cause the first test stripe to overlap a test stripe in any other combination in said test chart.

16. A color correcting method as set forth in claim 1, wherein said test chart is printed by said apparatus independent from any image of an original scanned by said apparatus.

17. A color correcting method for a color image generating apparatus for overlapping 3 or 4 color materials according to color image data of 3 separated colors of yellow (Y), magenta (M) and cyan (C) or of 4 separated colors of Y, M, C and black (K), respectively, to obtain a multicolor image, wherein a test chart including at least one 2-color combination of 2 of said 3 or 4 colors or a grid test pattern is printed and measured by a color detector to find a hue value and a color drift of said color image data is calculated from the found hue value, said method further comprising:

referencing a color reproduction model containing correction coefficients corresponding to said color drift, said correction coefficients being determined based on a signal from said color detector;

generating a color correction table from at least one correction coefficient of said model; and correcting at least one color of said color image data using said color correction table to thereby correct said color drift.

18. A color correcting method for a color image generating apparatus as set forth in claim 17, wherein said color reproduction model is formed by introducing a mutual interference term into a color stimuli substractive mixture model, wherein a plurality of correction coefficients of said mutual interference term corresponding to color drift is prepared; and wherein at least one of said correction coefficients is selected according to said signal from said color detector.

19. A color laser beam printer comprising:

a video signal generating circuit which generates a video signal of image data;

a generating circuit which generates a laser beam modulated with the video signal;

a scanning unit which scans the laser beam in a width direction of a photosensitive body;

a developing unit which sequentially forms electrostatic latent images of colors on the photosensitive body by the scanned laser beam and sequentially develops the formed electrostatic latent images with use of toners corresponding to the colors;

a body which collectively transfers onto a recording medium the toner images of the respective colors formed on the photosensitive body; and a fixing unit which fixes the toner images transferred onto the recording medium, wherein a test chart, including at least one 2-color combination of 4 colors of yellow (Y), magenta (M), cyan (C) and black (K), is recorded and detected by a color detector to determine a hue value, and wherein a relationship between the colors in said at least one 2-color combination of Y, M, C and K is calculated based on a variation in the hue value, and color correction is carried out based on a laser irradiation start position or a color correction table or based on a combination of said laser irradiation start position and said color correction table.

20. A color laser beam printer as set forth in claim 19, wherein said color detector is a spot sensor.

21. A color laser beam printer comprising:

a video signal generating circuit which generates a video signal of image data;

a generating circuit which generates a laser beam modulated with the video signal;

a scanning unit which scans the laser beam in a width direction of a photosensitive body;

a developing unit which sequentially forms electrostatic latent images of colors on the photosensitive body by the scanned laser beam and sequentially develops the formed electrostatic latent images with use of toners corresponding to the colors;

an intermediate transfer body which sequentially overlaps the toner images of the respective colors to form a blended-color toner image;

a body which collectively transfers onto a recording medium the toner images of the respective colors formed on the intermediate transfer means; and a fixing unit which fixes the toner images transferred onto the recording medium, wherein a test chart including at least one 2-color combination of 4 colors of yellow (Y), magenta (M), cyan (C) and black (K) is recorded and detected by a color detector installed close to a surface of the intermediate transfer body to determine a hue value, and wherein a relationship between the colors in said at least one plurality of 2-color combinations of Y, M, C and K is calculated based on a variation in the hue value, and correction is carried out based on a laser irradiation start position or a color correction table or based on a combination of said laser irradiation start position and said color correction table.

22. A color image generating apparatus wherein a laser beam or LED light modulated with an electric signal indicative of color information on a color image is scanned in a width direction of a photosensitive body to sequentially form electrostatic latent images of different colors thereon, the formed electrostatic latent images of the colors are sequentially developed with use of toners of the corresponding colors, the developed toner images of the colors are sequentially overlapped to form a blended-color toner image on an intermediate transfer body, and the formed toner images of the colors are collectively transferred and fixed onto a recording medium, said apparatus comprising:

a detecting circuit which detects a color drift when toner enters between said photosensitive body and said intermediate transfer body;

a finding circuit which finds a color drift tendency when a plurality of sheets are printed on a basis of data from said detecting circuit; and a correcting circuit which corrects the color drift based on said color drift tendency.

23. A color image generating apparatus comprising:

a video signal generating circuit which generates a video signal of image data;

a generating circuit which generates a laser beam modulated with the video signal;

a scanning circuit which scans the laser beam in a width direction of a photosensitive body;

a developing circuit which sequentially forms electrostatic latent images of colors on the photosensitive body by the scanned laser beam and sequentially develops the formed electrostatic latent images with use of toners corresponding to the colors;

an intermediate transfer body which sequentially overlaps the toner images of the respective colors to form a blended-color toner image;

a transfer unit which collectively transfers onto a recording medium the toner images of the respective colors formed on the intermediate transfer body; and a fixing unit which fixes the toner images transferred onto the recording medium;

a detecting circuit which detects a color drift when toner enters between said photosensitive body and said intermediate transfer body;

a finding circuit which finds a color drift tendency when a plurality of sheets are recorded on a basis of data from said detecting circuit;

a memory for storing therein said color drift tendency; and a correcting circuit which corrects the color drift on a basis of said color drift tendency stored in said memory.

24. A color image generating apparatus as set forth in claim 23, wherein a test chart including at least one 2-color combination of said plurality of colors is recorded and detected by a color detector on said photosensitive body or intermediate transfer body or downstream of said fixing unit to find a hue change, and wherein a relationship between the colors in said at least one 2-color combination of said plurality of colors is estimated from the hue change to determine a color drift tendency at the time of overlapping and recording of the colors, and a laser irradiation start position is corrected for each color based on said color drift tendency.

25. A color image generating apparatus as set forth in claim 23, wherein a test chart including at least one 2-color combination of said plurality of colors is recorded and detected by a color detector on said photosensitive body or intermediate transfer body or downstream of said fixing unit to find a hue change, and wherein a relationship between the colors in said at least one 2-color combination of said plurality of colors is estimated from the hue change to determine a color drift tendency at the time of overlapping and recording of the colors, and color correction is performed according to the color drift tendency.

26. A method for correcting color in a color image printing apparatus, comprising steps of:

setting a predetermined relationship between a first color and second color to be printed by said apparatus, said predetermined relationship providing a reference for determining color error in said apparatus;

printing information containing the first color and the second color;

determining a relationship between the first color and the second in said information; and performing color correction based on a comparison of the relationship determined between the first color and the second color in said information to said predetermined relationship.

27. A method as set forth in claim 26, wherein the determining step includes:

reading the first color and the second color in said information using a color detector to derive color data; and determining a hue value from the color data, wherein the comparison of the relationship determined between the first and second color in said information to said predetermined relationship is based on said hue value.

28. A method as set forth in claim 26, wherein the first color and the second color in said information are expressed as a first stripe and a second stripe, respectively, wherein said step of determining a relationship between the first color and the second color in said information includes determining a relationship between said first stripe and said second stripe, wherein said predetermined relationship between the first color and the second color corresponds to a predetermined relationship between said first stripe and said second stripe, and wherein said step of performing color correction includes correcting the relationship between said first stripe and said second stripe to said predetermined relationship, to thereby reduce color error in said apparatus.

29. A method as set forth in claim 28, wherein said predetermined relationship between said first stripe and said second stripe corresponds said first stripe overlapping said second stripe by a predetermined amount.

30. A method as set forth in claim 29, wherein said predetermined amount corresponds to a percentage of a width of one of said first stripe and said second stripe.

31. A method as set forth in claim 30, wherein said predetermined amount equals 50% of said width.

32. A method as set forth in claim 26, wherein said color error includes color drift in said apparatus.

* * * * *